US012223899B2

(12) United States Patent
Kim et al.

(10) Patent No.: US 12,223,899 B2
(45) Date of Patent: Feb. 11, 2025

(54) DISPLAY DEVICE AND METHOD FOR OPERATING PIXELS OF THE DISPLAY DEVICE

(71) Applicant: LG DISPLAY CO., LTD., Seoul (KR)

(72) Inventors: Haksu Kim, Daegu (KR); Hwanjoo Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/214,845

(22) Filed: Jun. 27, 2023

(65) Prior Publication Data

US 2024/0005859 A1 Jan. 4, 2024

(30) Foreign Application Priority Data

Jun. 30, 2022 (KR) ........................ 10-2022-0080630

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0213* (2013.01); *G09G 2310/0297* (2013.01);
(Continued)

(58) Field of Classification Search
CPC ......... G09G 3/3233; G09G 2300/0819; G09G 2300/0842; G09G 2300/0861; G09G 2310/0213; G09G 2310/0297; G09G 2310/08; G09G 2320/0233; G09G 2320/045; G09G 2310/0251; G09G 2310/0262; G09G 2320/0242;
(Continued)

(56) References Cited

U.S. PATENT DOCUMENTS

| | | | | |
|---|---|---|---|---|
| 10,004,124 B1 * | 6/2018 | Ko | ........................ | G09G 3/3233 |
| 2014/0375616 A1 * | 12/2014 | Kim | ..................... | G09G 3/3266<br>345/76 |
| 2016/0210900 A1 * | 7/2016 | Kim | ..................... | G09G 3/3266 |

(Continued)

FOREIGN PATENT DOCUMENTS

KR 20130055450 A 5/2013

OTHER PUBLICATIONS

Office Action in Korean Appln, No. 10-2022-0080630, mailed on Oct. 29, 2024, 24 pages (with English translation).

*Primary Examiner* — Jeff Piziali
(74) *Attorney, Agent, or Firm* — Fish & Richardson P.C.

(57) ABSTRACT

Disclosed are a display device and a method for operating pixels of the display device. The display device comprises: a light-emitting element; and a pixel circuit configured to control the light-emitting element, wherein the pixel circuit includes: a capacitor connected to and disposed between a first node and a second node; and a driving transistor including a gate electrode connected to the second node; a first electrode receiving a high-potential driving voltage; and a second electrode connected to a third node, wherein the pixel circuit is configured such that the same voltage is supplied to the first node and the second node during at least a portion of an operation period of the pixel circuit. Thus, occurrence of a reference voltage related short-circuit in the light-emitting element of the pixel circuit is suppressed to prevent occurrence of defective image display in each pixel and to improve reliability thereof.

16 Claims, 11 Drawing Sheets

(52) U.S. Cl.
CPC . *G09G 2310/08* (2013.01); *G09G 2320/0233* (2013.01); *G09G 2320/045* (2013.01)

(58) Field of Classification Search
CPC ............... G09G 3/3225; G09G 3/3266; G09G 2310/0264; G09G 2330/028
See application file for complete search history.

(56) References Cited

U.S. PATENT DOCUMENTS

| | | | | |
|---|---|---|---|---|
| 2019/0130832 | A1* | 5/2019 | Chang .................. | G09G 3/3266 |
| 2021/0035502 | A1* | 2/2021 | Lee ...................... | G09G 3/3291 |
| 2021/0151542 | A1* | 5/2021 | Choe .................... | H10K 59/126 |

* cited by examiner

DISPLAY DEVICE AND METHOD FOR OPERATING PIXELS OF THE DISPLAY DEVICE

CROSS-REFERENCE TO RELATED APPLICATIONS

This application claims priority from Korean Patent Application No. 10-2022-0080630 filed on Jun. 30, 2022 in the Korean Intellectual Property Office, and all the benefits accruing therefrom under 35 U.S.C. 119, the contents of which in its entirety are herein incorporated by reference.

TECHNICAL FIELD

The present disclosure relates to a display device, and more particularly, to a display device in which occurrence of a reference voltage related short-circuit is prevented by improving a pixel circuit structure for a light-emitting element formed in each pixel.

BACKGROUND

An image display device which displays various information on a screen is a key technology in the information communication era and is developing such that the image display device is thinner and lighter, and portable, and has high-performance.

In particular, a display device is advantageous in terms of power consumption due to low operation voltage and also has a high response speed, high light-emitting efficiency, and excellent viewing angle and contrast ratio, and thus is getting more attention as color display means.

The display device displays an image using a plurality of pixels arranged in a matrix form. Each pixel is composed of a light-emitting element, and a driving circuit including a switching transistor, a driving transistor, and a capacitor configured to independently control the light-emitting element.

The switching transistor of each pixel transmits a data voltage to the driving transistor and the capacitor, and the driving transistor controls a current flowing in the light-emitting element. Accordingly, brightness of each pixel is proportional to a current amount flowing in the light-emitting element. The current amount flowing in the light-emitting element is determined based on a difference between voltages of a gate and a source of the driving transistor and a threshold voltage of the driving transistor.

However, the threshold voltage of the driving transistor is gradually changed over an the life of the image display device and a deviation between pixel brightness occurs. Accordingly, a sampling pixel structure for sampling and compensating for the threshold voltage of the driving transistor has been conventionally proposed.

In this sampling pixel structure, a short-circuit between a high-potential driving voltage and a reference voltage may occur in each of some pixel circuits during an initialization period. In this case, display defects, such as horizontal stripe stains, may occur on the display device.

SUMMARY

A technical purpose of the present disclosure is to provide a display device in which occurrence of a reference voltage related short-circuit in a pixel circuit is suppressed by improving a pixel circuit structure for a light-emitting element formed in each pixel.

Purposes according to the present disclosure are not limited to the above-mentioned purpose. Other purposes and advantages according to the present disclosure that are not mentioned may be understood based on following descriptions and may be more clearly understood based on embodiments according to the present disclosure. Further, it will be easily understood that the purposes and advantages according to the present disclosure may be realized using means shown in the claims and combinations thereof.

A first aspect of the present disclosure provides a display device comprising: a light-emitting element; and a pixel circuit configured to control the light-emitting element, wherein the pixel circuit includes: a capacitor connected to and disposed between a first node and a second node; and a driving transistor including a gate electrode connected to the second node; a first electrode receiving a high-potential driving voltage; and a second electrode connected to a third node, wherein the pixel circuit is configured such that the same voltage is supplied to the first node and the second node during at least a portion of an operation period of the pixel circuit.

A second aspect of the present disclosure provides a display device comprising: a display panel in which a plurality of data lines, a plurality of scan lines, a plurality of light-emission control lines, and a plurality of pixels are disposed; a gate driver sequentially supplying a scan signal to the plurality of scan lines and sequentially supplying a light-emission control signal to the plurality of light-emission control lines; a data driver supplying a data voltage to the plurality of data lines; and a controller for controlling the gate driver and the data driver, wherein each of the plurality of pixels includes: a light-emitting element; and a pixel circuit configured to control the light-emitting element, wherein the pixel circuit includes: a capacitor connected to and disposed between a first node and a second node; and a driving transistor including a gate electrode connected to the second node; a first electrode receiving a high-potential driving voltage; and a second electrode connected to a third node, wherein the pixel circuit is configured such that the same voltage is supplied to the first node and the second node during at least a portion of an operation period of the pixel circuit.

The specific details of other embodiments are included in the detailed description and drawings.

In the display device according to aspects of the present disclosure as described above, the pixel circuit structure for the light-emitting element may be improved such that during the initialization period, the voltages of both opposing ends of the capacitor may be initialized with the same reference voltage. This may eliminate the initialization short-circuit of the pixel circuit, thereby preventing the occurrence of defective image display of each pixel and improving reliability thereof.

Effects according to the present disclosure are not limited to the above effect as set forth above, and other effects not mentioned above may be clearly understood by those skilled in the art to which the present disclosure belongs from the detailed descriptions.

DETAILED DESCRIPTION

Figure 1:
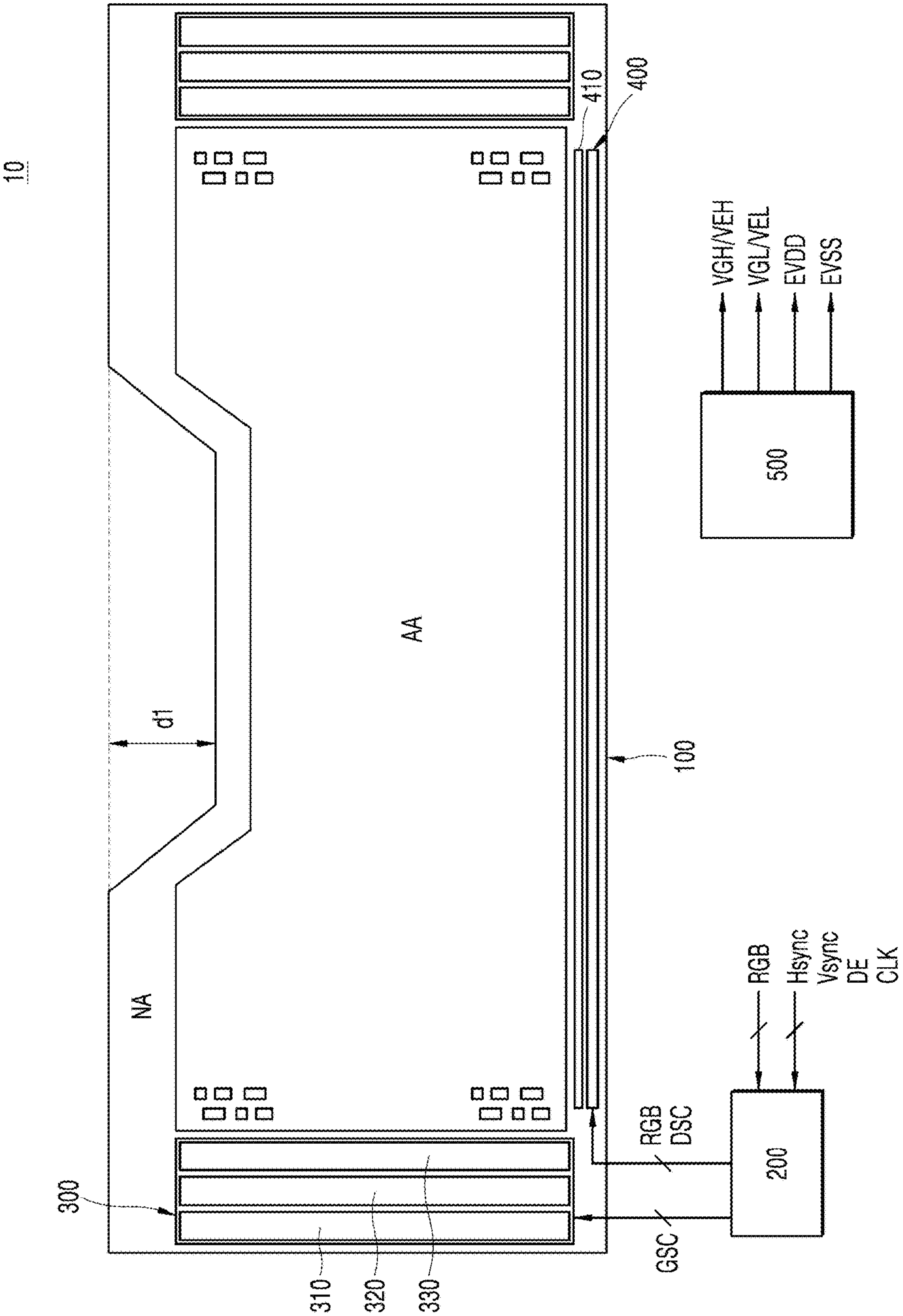
FIG. 1 is a schematic block diagram of a display device according to an aspect of the present disclosure.

Advantages and features of the present disclosure, and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting to the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof.

As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A pixel circuit of a display device writes pixel data of an input image into pixels. The pixel circuit of a flat panel display device includes a data driver that supplies a data signal to data lines, a gate driver that supplies a gate signal to gate lines, etc.

In a display device according to the present disclosure, each of the pixel circuit and the gate driver may include a plurality of transistors and may be directly formed on a substrate of a display panel. The transistor may be implemented as a thin film transistor (TFT) of a Metal-Oxide-Semiconductor field effect transistor (MOSFET) structure, or as an oxide TFT including an oxide semiconductor or an Low Temperature Poly Silicon (LTPS) TFT.

The transistor is a 3 electrodes element including a gate, a source, and a drain. The source is an electrode that supplies a carrier to the transistor. In the transistor, the carriers start flowing from the source. The drain is an electrode through which the carriers exit from the transistor. The carriers flow from the source to the drain in the transistor. In an n-channel transistor, the carriers are electrons. Thus, a source voltage is lower than a drain voltage so that the electrons may flow from the source to the drain. Thus, a direction of the current in the re-channel transistor is from the drain to the source. In a p channel transistor, a carrier is a hole. Thus, the source voltage is higher than the drain voltage so that the holes may flow from the source to the drain. In the p channel transistor, the holes flow from the source to the drain, and thus the current flows from the source to the drain. It should be noted that the source and the drain of the transistor are not fixed. For example, the source and the drain may be exchanged with each other according to an applied voltage. Therefore, the present disclosure is not limited due to the source and drain of the transistor.

Hereinafter, an example of a display device according to an aspect of the present disclosure will be described in detail with reference to the accompanying drawings. In allocating reference numerals to components in drawings, the same components may have the same numerals as much as possible even though the same components are shown in different drawings. In addition, a scale of each of the components shown in the accompanying drawings has a scale different from an actual scale for convenience of illustration. The present disclosure is not limited to the scale shown in the drawing.

Hereinafter, a display device according to an aspect of the present disclosure will be described in more detail with reference to the accompanying drawings.

FIG. 1 is a schematic block diagram of a display device according to an aspect of the present disclosure.

Referring to FIG. 1, a display device 10 includes a display panel 100 including a plurality of pixels, a controller 200, a gate driver 300 supplying a gate signal to each of the plurality of pixels, a data driver 400 for supplying a data signal each of the plurality of pixels, and a power supply 500 for supplying power necessary for driving each of the plurality of pixels.

The display panel 100 includes a display area AA where a pixel is located and a non-display area NA surrounding the display area AA. The gate driver 300 and the data driver 400 are disposed in the non-display area NA.

In the display panel 100, a plurality of gate lines GL, a plurality of light-emission lines EL, and a plurality of data lines DL intersect each other. Each of the plurality of pixels is connected to the gate line GL and the data line DL. Specifically, one pixel receives the gate signal from the gate driver 300 via the gate line GL, receives the data signal from the data driver 400 via the data line DL, and receives a variety of powers from the power supply 500 via a power line.

In this regard, the gate line GL supplies a scan signal SC and a light-emission control signal EM, and the data line DL supplies a data voltage Vdata. However, according to various aspects, the gate line GL may include a plurality of scan lines SCL and a light-emission control signal line EML. Further, one pixel may receive a high-potential driving voltage EVDD and a low-potential driving voltage EVSS and may additionally include a reference voltage line RL and receive a reference voltage Vref via the reference voltage line RL.

Further, each pixel includes a light-emitting element 170 and a pixel circuit that controls an operation of the light-emitting element 170. In this regard, the light-emitting element 170 is composed of an anode electrode 171, a cathode electrode 173, and a light-emitting layer 172 between the anode electrode 171 and the cathode electrode 173. The pixel circuit includes a plurality of switching elements, a driving element, and a capacitor. In this regard, each switching element may be embodied as a thin-film transistor. The driving element may be embodied as a thin-film transistor. In the pixel circuit, the driving transistor controls an amount of current supplied to the light-emitting element 170 based on a difference between a data voltage charged in the capacitor and the reference voltage to adjust an amount of light emitted from the light-emitting element 170. Further, the plurality of switching transistors receive the scan signal SC supplied via the plurality of scan line SCL and the light-emission control signal EM supplied via the light-emission control line EML and charges the data voltage Vdata to the capacitor.

Referring to FIG. 1, the display panel 100 may have a side having a recess. In other words, the other side parallel to one side where the data driver 400 is disposed may be formed in a shape that is inwardly recessed by a first length dl.

The display panel 100 may be implemented as a non-transmissive display panel or a transmissive display panel. The transmissive display panel may be applied to a transparent display device in which an image is displayed on a screen and a real object on a background is visible. The display panel may be manufactured as a flexible display panel. The flexible display panel may be implemented as an organic light emitting diode (OLED) panel using a plastic substrate.

Each of pixels may include a red pixel, a green pixel, and a blue pixel for color rendering. Each of the pixels may further include a white pixel. Each of the pixels includes a pixel circuit.

Touch sensors may be disposed on the display panel 100. A touch input may be sensed using separate touch sensors or through the pixels. Each of the touch sensors is of an on-cell type or of an add-on type in which the touch sensor is disposed on the screen of the display panel. Alternatively, each of the touch sensors is of an in-cell type in which the touch sensor is embedded in the display panel 100.

The controller 200 processes image data RGB input from an external component to comply with a size and a resolution of the display panel 100 and supplies the processed image data to the data driver 400. The controller 200 generates a gate control signal GSC and a data control signal DCS using sync signals SYNC input from an external component, for example, a data clock signal CLK, a data enable signal DE, a horizontal sync signal Hsync, and a vertical sync signal Vsync. The controller 200 supplies the generated gate control signal GSC and the generated data control signal DCS to the gate driver 300 and the data driver 400, respectively to control the gate driver 300 and the data driver 400.

The controller 200 may be coupled to various processors, for example, a microprocessor, a mobile processor, an application processor, etc., depending on a type of a device on which the controller 200 is mounted.

A host system may be any one of a television (TV) system, a set-top box, a navigation system, a personal computer (PC), a home theater system, a mobile device, a wearable device, and a vehicle system.

The controller 200 multiplies an input frame frequency by i and controls an operation timing of a display panel driver using a frame frequency=the input frame frequency×i (i is a positive integer greater than 0) Hz. The input frame frequency is 60 Hz in the National Television Standards Committee (NTSC) scheme and is 50 Hz in the Phase-Alternating Line (PAL) scheme.

The controller 200 generates a signal so that the pixel may operate at various refresh rates. That is, the controller 200 generates operation-related signals such that the pixel may operate in a Variable Refresh Rate (VRR) mode or a refresh rate thereof may be switchable between a first refresh rate and the second refresh rate. For example, the controller 200 may simply change a rate of a clock signal, may generate a synchronization signal to generate a horizontal blank or a vertical blank, or may operate the gate driver 300 at various refresh rates.

The controller 200 generates, based on the timing signals Vsync, Hsync, and data enable signal DE received from the host system, the gate control signal GSC for controlling the operation timing of the gate driver 300, the data control signal DSC for controlling the operation timing of the data driver 400, and demultiplexer signals DEMUX1 and DEMUX2 for controlling an operation timing of a demultiplexer unit 410. The controller 200 controls an operation timing of the display panel driver to synchronize the gate driver 300, the data driver 400, the demultiplexer unit 410, and a touch sensor driver (not shown) with each other.

A level shifter (not shown) converts a voltage level of the gate control signal GSC output from the controller 200 into a gate on voltage VGL and VEL and a gate off voltage VGH and VEH, which in turn are supplied to the gate driver 300. The level shifter converts a low level voltage of the gate control signal GSC to a gate low voltage VGL, and converts a high level voltage of the gate control signal GSC to a gate high voltage VGH. The gate control signal GSC includes a start pulse and a shift clock.

The gate driver 300 supplies the scan signal SC to the gate line GL according to the gate control signal GCS supplied from the controller 200. The gate driver 300 may be disposed at one side or each of both opposing sides of the display panel 100 and in a gate-in-panel (GIP) manner.

The gate driver 300 sequentially outputs the gate signal to the plurality of gate lines GL under control of the controller 200. The gate driver 300 may shift the gate signal using a shift register and sequentially supply the shifted gate signal to the gate lines GL.

The gate signal may include the scan signal SC and the light-emission control signal EM in an organic light-emitting display device. The scan signal SC includes a scan pulse that alternates between the gate on voltage VGL and the gate off voltage VGH. The light-emission control signal may include a light-emission control signal pulse that alternates between the gate on voltage VEL and the gate off voltage VEH.

The scan pulse is synchronized with the data voltage Vdata to select pixels of a line to which data is to be written. The light-emission control signal defines a light-emitting time of each of pixels.

The gate driver 300 may include a light-emission control signal driver 310, a first scan driver 320, and a second scan driver 330.

The light-emission control signal driver 310 outputs the light-emission control signal pulse in response to the start pulse and the shift clock received from the controller 200 and sequentially shifts the light-emission control signal pulse according to the shift clock.

In response to the start pulse and the shift clock received from the controller 200, each of the first scan driver 320 and the second scan driver 330 outputs the scan pulse and shifts the scan pulse according to a shift clock timing.

Referring to FIG. 1, the light-emission control signal driver 310 may be disposed at the outermost side in an area of the gate driver 300. However, the present disclosure is not limited thereto. Depending on an aspect, the light-emission control signal driver 310 may be disposed between the first scan driver 320 and the second scan driver 330, or between the first scan driver 320 and the second scan driver 330 and the display area AA of the display panel 100.

The data driver 400 converts the image data RGB into the data voltage Vdata according to the data control signal DCS supplied from the controller 200 and supplies the converted data voltage Vdata to the pixel via the data line DL. In FIG. 1, Although the data driver 400 is disposed at a side of the display panel 100, the number and a position of the data drivers 400 are not limited thereto. That is, the data driver 400 may be embodied as a plurality of integrated circuits (ICs) which may be disposed at one side of the display panel 100 and may be separately arranged along the one side.

The demultiplexer unit 410 may be disposed between the data driver 400 and the display area AA of the display panel 100. The demultiplexer unit 410 includes a plurality of demultiplexers DEMUX and distributes the data voltage output from each of channels of the data driver 400 to the data lines DL using the plurality of demultiplexers DEMUX. The demultiplexer unit 410 may distribute the data voltage output from one channel of the data driver 400 to the data lines DL in a time division manner, such that the number of channels of the data driver 400 may be reduced.

The power supply 500 generates direct current (DC) power for operating a pixel array of the display panel 100 and the display panel driver using a DC-DC converter. The DC-DC converter may include a charge pump, a regulator, a buck converter, a boost converter, etc. The power supply 500 receives a DC input voltage applied from the host system (not shown) and generates various DC voltages, such as the gate on voltage VGL and VEL, the gate off voltage VGH and VEH, the high-potential driving voltage EVDD, the low-potential driving voltage EVSS, and the reference voltage Vref. The gate on voltage VGL and VEL and the gate off voltage VGH and VEH are supplied to a level shifter (not shown) and the gate driver 300. Each of the high-potential driving voltage EVDD, the low-potential driving voltage EVSS, and the reference voltage Vref is commonly supplied to the pixels.

Figure 2:
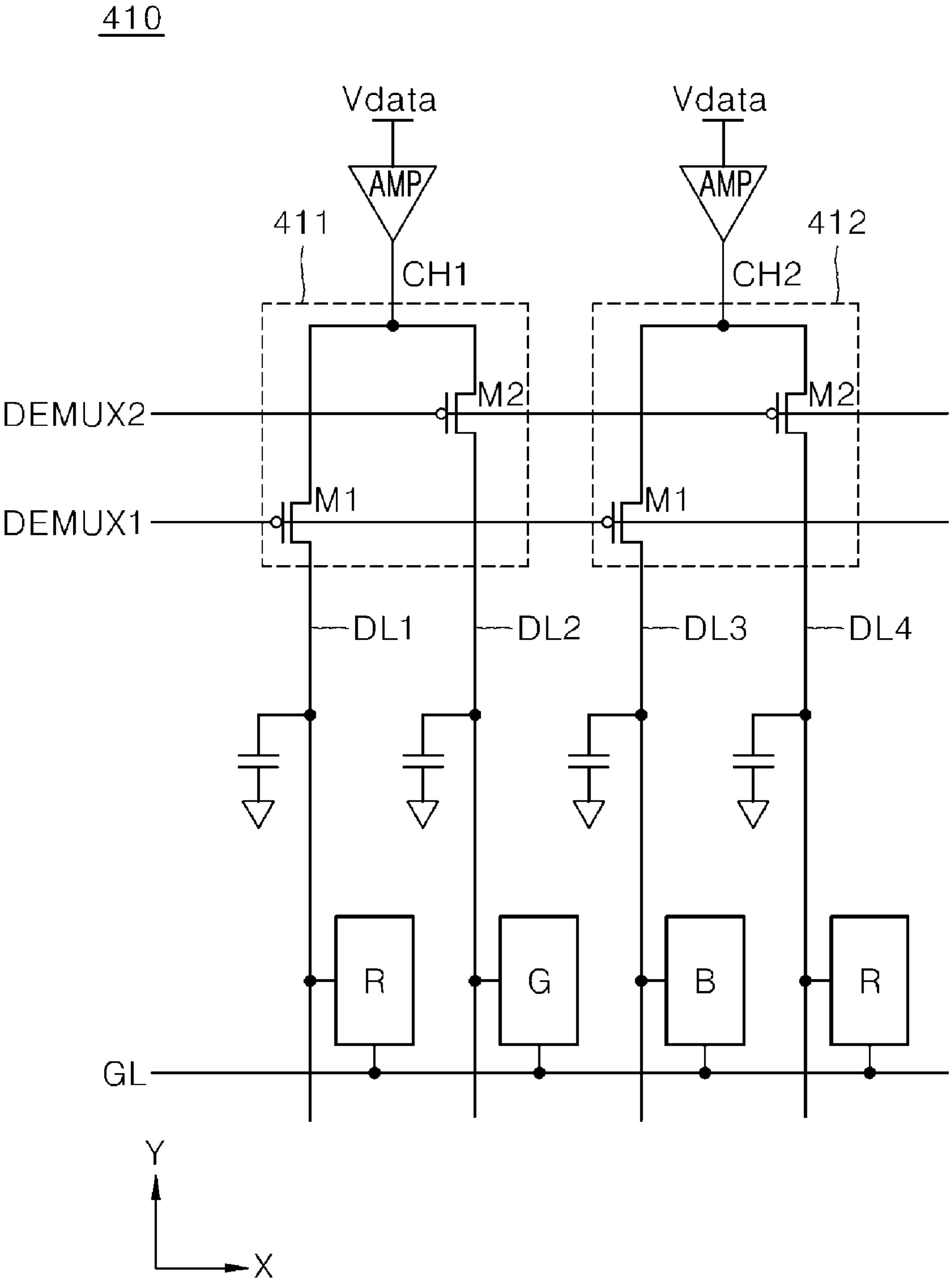
FIG. 2 is a circuit diagram showing a configuration of a demultiplexer in a display device according to an aspect of the present disclosure.

FIG. 2 is a circuit diagram showing a configuration of a demultiplexer in a display device according to an aspect of the present disclosure.

Referring to FIG. 2, each of demultiplexers 411 and 412 may be an 1:N demultiplexer with one input node and N output nodes (N is a positive integer greater than or equal to 2). Each of the demultiplexers 321 and 322 may include first and second switch elements M1 and M2.

Referring to FIG. 2, the data voltage Vdata may be sequentially applied to a pixel row on one horizontal period basis. In an aspect, the horizontal period corresponds to a period for which one pixel row is turned on once.

The first switch element M1 is turned on in response to a gate on voltage VGL of the first DEMUX signal DEMUX1. In this regard, a first channel CH1 of the data driver 400 outputs the data voltage Vdata via an output buffer AMP, and the data voltage Vdata is applied to a first data line DL1 via the first switch element M1. At the same time, a second channel CH2 of the data driver 400 outputs the data voltage Vdata through the output buffer AMP, and the data voltage Vdata is applied to a third data line DL3 through the first switch element M1. Therefore, the data voltage Vdata is configured to charge a capacitor of each of the first and third data lines DL1 and DL3 during a ½ horizontal period.

Then, the second switch element M2 is turned on in response to a gate on voltage VGL of the second DEMUX signal DEMUX2. In this regard, the first channel CH1 of the data driver 400 outputs the data voltage Vdata through the output buffer AMP, and the data voltage Vdata is applied to a second data line DL2 through the second switch element M2. At the same time, the second channel CH2 of the data driver 400 outputs the data voltage Vdata through the output buffer AMP, and the data voltage Vdata is applied to a fourth data line DL4 through the second switch element M2. Therefore, the data voltage is configured to charge a capacitor of each of the second and fourth data lines DL2 and DL4 during a ½ horizontal period.

Figure 3:
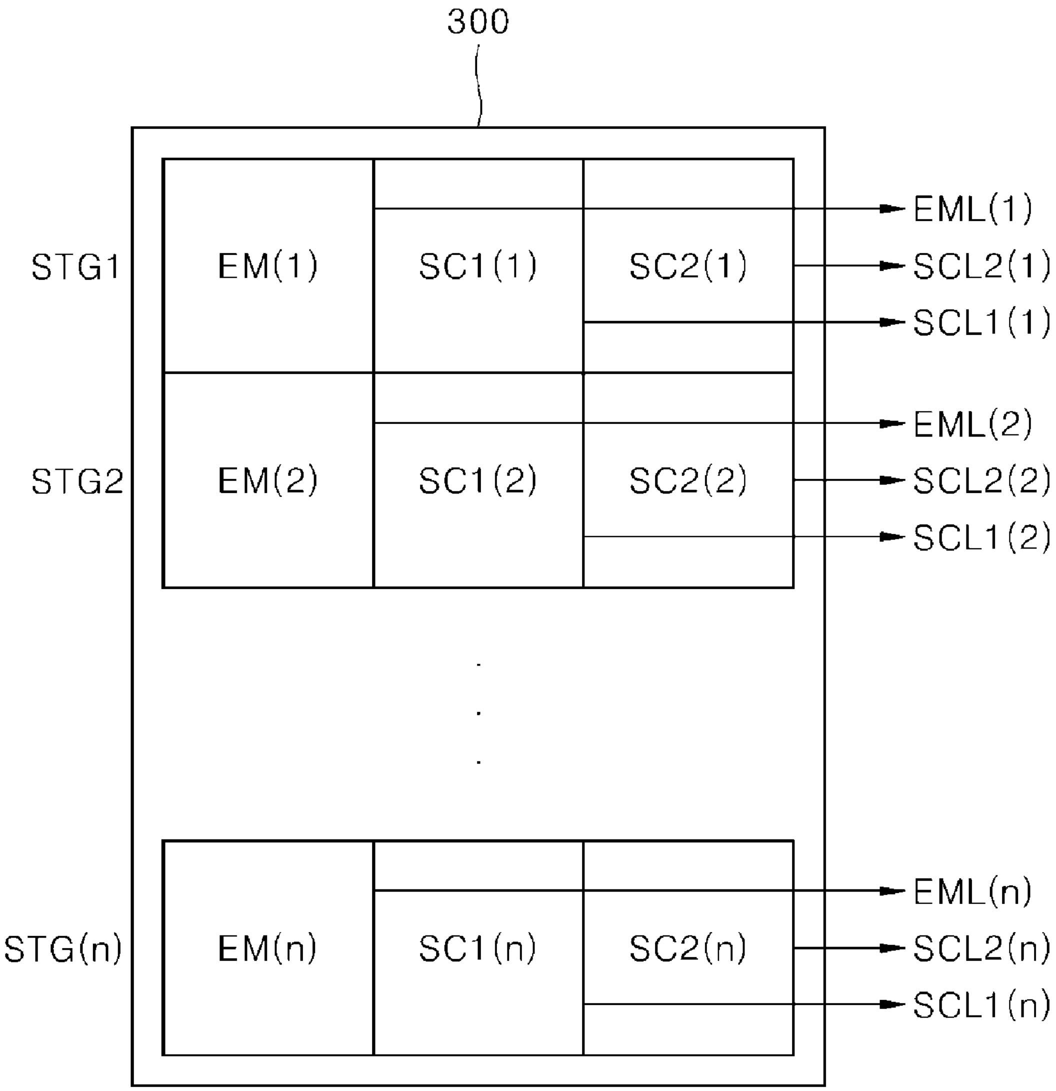
FIG. 3 is a diagram of a stage of a gate driver included in a display device according to an aspect of the present disclosure.

FIG. 3 is a diagram of a gate driver stage included in a display device according to an aspect of the present disclosure.

Referring to FIG. 3, in the gate driver 300 including the light-emission control signal driver 310, the first scan driver 320 and the second scan driver 330, each of stages STG1 to STGn of the shift register may include each of first scan signal generators SC1(1) to SC1(*n*), each of second scan signal generators SC2(1) to SC2(*n*), and each of light-emission control signal generators EM(1) to EM(n). In one example, the first stage STG1 of the shift register 131 includes the first scan signal generator SC1(1) outputting a first scan signal SC1(1), the second scan signal generator SC2(1) which outputs a second scan signal SC2(1), and the light-emission control signal generator EM(1) which outputs a light-emission control signal EML(1).

The first scan signal generators SC1(1) to SC1(*n*) respectively output the first scan signals SC1(1) to SC1(*n*) via first scan lines SCL1 of the display panel. The second scan signal generators SC2(1) to SC2(*n*) respectively output the second scan signals SC2(1) to SC2(*n*) via second scan lines SCL2 of the display panel. The light-emission control signal generators EM(1) to EM(n) respectively output the light-emission control signals EM(1) to EM(n) via light-emission control lines EML of the display panel.

Each of the first scan signals SC1(1) to SC1(*n*) may drive an A-th transistor (e.g., a switching transistor, etc.) included in each of pixels. Each of the second scan signals SC2(1) to SC2(*n*) may drive a B-th transistor (e.g., a sensing transistor, etc.) included in each of pixels.

Each of the light-emission control signals EM(1) to EM(n) may drive a C-th transistor (e.g., a light-emission control transistor, etc.) included in each of pixels. For example, when the light-emission control transistor of each of the pixels is controlled based on each of the light-emission control signals EM(1) to EM(n), and a light-emission time of the light-emitting element thereof is varied.

Figure 4:
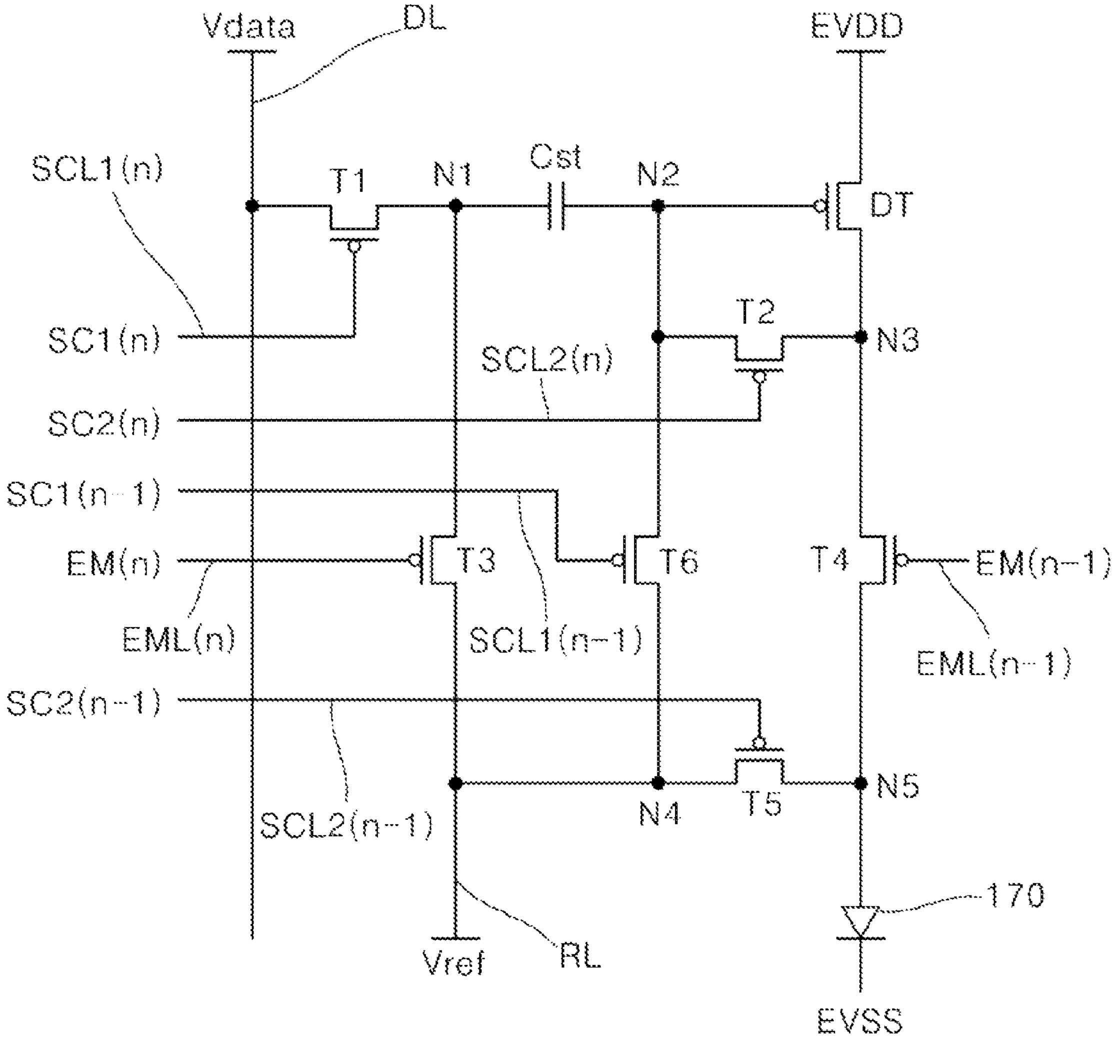
FIG. 4 is a diagram of a pixel circuit of a display device according to an aspect of the present disclosure.

FIG. 4 is a diagram of a pixel circuit of a display device according to an aspect of the present disclosure.

Referring to FIG. 4, each of the pixels arranged in the display panel 100 includes the light-emitting element 170 and a pixel circuit that independently drives the light-emitting element 170.

In other words, each pixel includes the pixel circuit connected to each scan line SCL1 and SCL2, each data line DL, each reference voltage line RL, each light-emission control line EML, each high-potential driving voltage EVDD, and the light-emitting element 170 connected to and disposed between the pixel circuit and the low-potential driving voltage EVSS, wherein the light-emitting element 170 equivalently corresponds to a diode.

The pixel circuit of each pixel includes first to sixth switching transistors T1 to T6, a driving transistor DT and a capacitor Cst.

In this regard, each of the first to sixth switching transistors T1 to T6 and the driving transistor DT may be embodied as a p-type transistor or an n-type transistor. Hereinafter, an example in which each of the first to sixth switching transistors T1 to T6 and the driving transistor DT is embodied as the p-type transistors will be described. However, the present disclosure is not limited thereto. According to aspects of the disclosure, at least one transistor may be implemented as the n-type transistor.

In the p-type transistor, a low level voltage of each driving signal corresponds to a gate-on voltage that turns on the transistor. A high level voltage of each driving signal may be a gate-off voltage for turning off the transistor. In the n-type transistor, the low level voltage of each driving signal corresponds to a gate-off voltage for turning off the transistor, and the high level voltage of each driving signal may be a gate-on voltage for turning on the transistor.

Further, at least one of the first to sixth switching transistors T1 to T6 and the driving transistor DT may be embodied as an oxide thin-film transistor. At least one of the first to sixth switching transistors T1 to T6 and the driving transistor DT may be embodied as a polycrystalline silicon thin-film transistor. However, the present disclosure is not limited thereto, and all transistors may be embodied as oxide thin-film transistors or polycrystalline silicon thin-film transistors.

According to embodiments, the pixel circuit may include a plurality of capacitors. Although not shown, for example, the pixel circuit may include the capacitor Cst and an additional capacitor. In some aspects, the additional capacitor can store a stable voltage to reduce transient effects. However, the present disclosure is not limited thereto and the additional capacitor may operate as a component for more stable pixel operation.

The pixel circuit may be connected to the power line that supplies the high-potential driving voltage EVDD and the low-potential driving voltage EVSS, the reference voltage line RL that supplies the reference voltage Vref, and the data line DL that supplies the data voltage V data.

A first electrode or a second electrode of each transistor may correspond to a source electrode or a drain electrode. For example, the first electrode may correspond to the source electrode and the second electrode may correspond to the drain electrode. In another example, the second electrode may correspond to the source electrode and the first electrode may correspond to the drain electrode.

A first electrode of the first switching transistor T1 may be connected to the data line DL. A second electrode of the first switching transistor T1 may be connected to at least one of the capacitor Cst and a first electrode of the third switching transistor T3.

A gate electrode of the first switching transistor T1 may be connected to the first scan line SCL1. The first switching transistor T1 is turned on or off based on to the first scan signal SC1(*n*) of an n-th pixel row applied via the first scan line S CL1. When the first switching transistor T1 is turned on, the first switching transistor T1 supplies the data voltage Vdata from the data line DL to a first node N1 and the capacitor Cst is charged with the data voltage Vdata.

A first electrode of the second switching transistor T2 may be connected to a second node N2. The first electrode of the second switching transistor T2 may be connected to at least one of a gate electrode of the driving transistor DT, the capacitor Cst, and a first electrode of the sixth switching transistor T6. A second electrode of the second switching transistor T2 may be connected to a third node N3. The second electrode of the second switching transistor T2 may be connected to at least one of a second electrode of the driving transistor DT and a first electrode of the fourth switching transistor T4.

A gate electrode of the second switching transistor T2 may be connected to the second scan line SCL2. The second switching transistor T2 is turned on or off based on the second scan signal SC2(*n*) of the n-th pixel row applied via the second scan line SCL2. When the second switching transistor T2 is turned on, the second switching transistor T2 may connect the second node N2 and the third node N3 to each other. In other words, the second switching transistor T2 may electrically connect a gate electrode and a drain electrode of the driving transistor DT to each other such that the driving transistor DT is conductive in a diode manner.

A first electrode of the third switching transistor T3 may be connected to the first node N1, and a second electrode of the third switching transistor T3 may be connected to a fourth node N4. The first electrode of the third switching transistor T3 may be connected to at least one of the second electrode of the first switching transistor T1 and one side of the capacitor Cst. Further, the second electrode of the third switching transistor T3 may be connected to the first electrode of the fifth switching transistor T5 and the reference voltage line RL.

A gate electrode of the third switching transistor T3 may be connected to the light-emission control line EML. The third switching transistor T3 may be turned on or off based on the light-emission control signal EM(n) of the n-th pixel row applied via the light-emission control line EML. The third switching transistor T3 is turned on to connect the first node N1 and the fourth node N4 to each other, so that the reference voltage Vref of the reference voltage line RL is applied to the first node N1 to which the capacitor Cst is connected.

A first electrode of the fourth switching transistor T4 may be connected to the third node N3. The first electrode of the fourth switching transistor T4 may be connected to at least one of the second electrode of the second switching transistor T2 and the second electrode of the driving transistor DT. A second electrode of the fourth switching transistor T4 may be connected to a fifth node N5. The second electrode of the fourth switching transistor T4 may be connected to at least one of a second electrode of a fifth switching transistor T5 and the light-emitting element 170.

A gate electrode of the fourth switching transistor T4 may be connected to the light-emission control line EML. The fourth switching transistor T4 is turned on or turned off based on a light-emission control signal EM(n−1) of a previous pixel row (or an (n−1)-th pixel row) applied via the light-emission control line EML. The fourth switching transistor T4 is turned on to connect the third node N3 and the fifth node N5 to each other.

A first electrode of the fifth switching transistor T5 may be connected to the fourth node N4, and a second electrode thereof may be connected to the fifth node N5. The first electrode of the fifth switching transistor T5 may be connected to at least one of the second electrode of the third switching transistor T3, a second electrode of the sixth switching transistor T6, and the reference voltage line RL. The second electrode of the fifth switching transistor T5 may be connected to at least one of the second electrode of the fourth switching transistor T4 and the light-emitting element 170.

A gate electrode of the fifth switching transistor T5 may be connected to the second scan line SCL2. The fifth switching transistor T5 and the second switching transistor T2 are turned on or off simultaneously based on the second scan signal SC2(*n*) of the n-th pixel row applied via the second scan line SCL2. The fifth switching transistor T5 is turned on to connect the fourth node N4 and the fifth node N5 to each other. In this regard, the fifth switching transistor T5 is a stabilizing element of the pixel circuit.

A first electrode of the sixth switching transistor T6 may be connected to the second node N2. The first electrode of the sixth switching transistor T6 may be connected to at least one of the gate electrode of the driving transistor DT, the capacitor Cst, and the first electrode of the second switching transistor T2. A second electrode of the sixth switching transistor T6 may be connected to the fourth node N4. The second electrode of the sixth switching transistor T6 may be connected to at least one of the second electrode of the third switching transistor T3, the reference voltage line RL, and the first electrode of the fifth switching transistor T5.

A gate electrode of the sixth switching transistor T6 may be connected to the first scan line SCL1. The sixth switching transistor T6 is turned on or off based on a first scan signal SC1(*n*−1) of the (n−1)-th pixel row applied via the first scan line SCL1. The sixth switching transistor T6 is turned on to connect the second node N2 and the fourth node N4 to each other, so that the reference voltage Vref of the reference voltage line RL is applied to the second node N2 to which the capacitor Cst is connected.

When the sixth switching transistor T6 is disposed between the gate electrode of the driving transistor DT and the reference voltage line RL, a current path of an initialization period of the pixel circuit may pass through the sixth switching transistor T6.

The capacitor Cst is connected to and disposed between the first and second nodes N1 and N2 and stores a difference between voltages of the first and second nodes N1 and N2. The capacitor Cst discharges the stored data voltage while the first switching transistor T1 is turned off, such that the driving transistor DT operates for at least one frame period.

The driving transistor DT is configured to drive the light-emitting element 170. The first electrode of the driving transistor DT may receive the high-potential driving voltage EVDD. The second electrode of the driving transistor DT may be connected to the third node N3. The gate electrode of the driving transistor DT may be connected to the second node N2.

The driving transistor DT controls an amount of current flowing through the light-emitting element 170 to correspond to a discharge voltage of the capacitor Cst input to the second node N2. In other words, the driving transistor DT is turned on or turned off based on a voltage of the second node N2. When being turned on, the driving transistor DT may supply the high-potential driving voltage EVDD to the third node N3.

The light-emitting element 170 includes an anode electrode 171 connected to the fourth switching transistor T4 of the pixel circuit, a cathode electrode 173 connected to the low-potential driving voltage EVSS, and a light-emitting layer 172 formed between the anode electrode 171 and the cathode electrode 173. This light-emitting element 170 emits light based on an output current amount of the driving transistor DT applied via the fourth switching transistor T4 of the pixel circuit.

Depending on an aspect, the light-emitting element 170 may include at least one of an organic light-emitting diode, an inorganic light-emitting diode, and a quantum dot light-emitting element. When the light-emitting element 170 comprises an organic light-emitting diode, the light-emitting layer 172 of the light-emitting element 170 may include the light-emitting layer 172 including an organic material.

FIG. 5A to FIG. 5D are diagrams for illustrating an operation period of the pixel circuit in FIG. 4 in accordance with some aspects of the disclosure.

Referring to FIG. 5A to FIG. 5D, a method for operating each pixel and operation characteristics of each pixel are described in detail as follows.

An operation period per each frame of each pixel may include an initialization period ST1, a sampling period ST2, a holding period ST3, and a light-emission period ST4.

During each operation period, each of the first to sixth switching transistors T1 to T6 and the driving transistor DT may be turned on/off based on the first scan signal SC1(*n*−1) and the light-emission control signal EM(n−1) of the (n−1)-th pixel row, and the first and second scan signals SC1(*n*) and SC2(*n*) and the light-emission control signal EM(n) of the n-th pixel row.

In this regard, the first scan signal SC1(*n*) may have a pulse width smaller than one horizontal period. For example, the first scan signal SC1(*n*−1) of the (n−1)-th pixel row may be converted from a low level voltage to a high level voltage, and after a certain duration delay, the first scan signal SC1(*n*) of the n-th pixel row may be converted to a low level voltage. However, as used herein, for convenience of description, an operation of each of the first and second scan signals SC1(*n*) and SC2(*n*) and the light-emission control signal EM(n) is described on one horizontal period basis.

Further, the first scan signal SC1(*n*) and the second scan signal SC2(*n*) may have different pulse widths. A pulse width of the first scan signal SC1(*n*) may be smaller than a pulse width of the second scan signal SC2(*n*). However, the present disclosure is not limited thereto, and the pulse width of the first scan signal SC1(*n*) may be equal to or larger than the pulse width of the second scan signal SC2(*n*).

In other words, when the first scan signal SC1(*n*) has a pulse width of 1 horizontal period, the second scan signal SC2(*n*) may have a pulse width of 2 horizontal periods. However, the present disclosure is not limited thereto, and the first scan signal SC1(*n*) and the second scan signal SC2(*n*) may have the same pulse width.

Figure 5A:
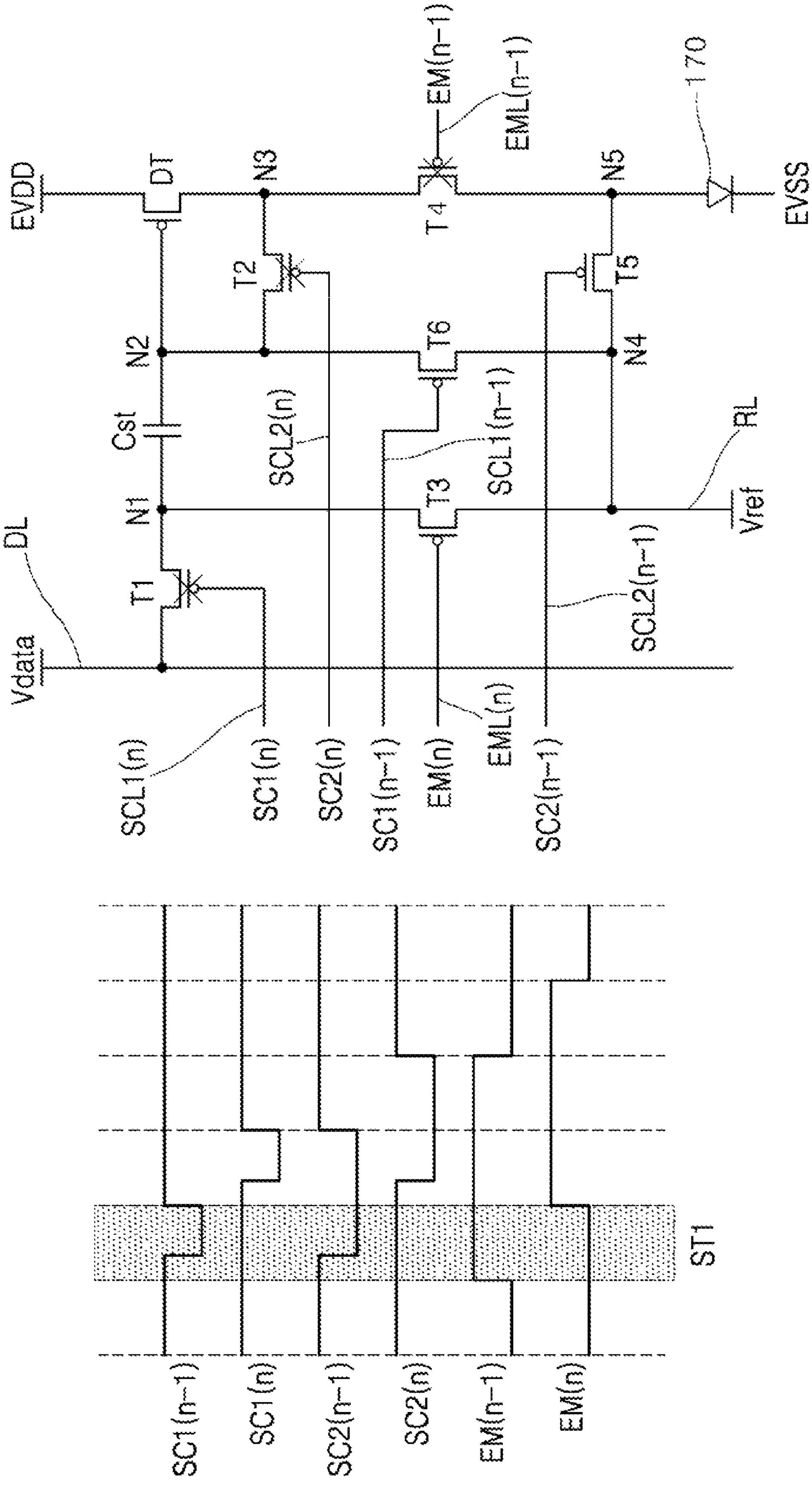
FIG. 5A to FIG. 5D are diagrams for illustrating an operation period of the pixel circuit in FIG. 4.

FIG. 5A is a diagram for illustrating a signal applied to each pixel during the initialization period in the operation period of each pixel and pixel operation characteristics of the initialization period.

The initialization period ST1 is a period during which the first and second nodes N1 and N2, which respectively connected to both opposing ends of the capacitor Cst, are initialized based on the reference voltage Vref before the first scan signal SC1(*n*) and the data voltage Vdata are supplied to the first switching transistor T1.

During the initialization period ST1, each of the first scan signal SC1(*n*−1) of the (n−1)-th (or previous) pixel row and the light-emission control signal EM(n) of the n-th pixel row may be input as a low level voltage. Each of the first scan signal of the n-th pixel row SC1(*n*), the second scan signal SC2(*n*) of the n-th pixel row, and the light-emission control signal EM(n−1) of the (n−1)-th pixel row may be input as a high level voltage.

For example, the initialization period ST1 may start in response to the light-emission control signal EM(n−1) of the (n−1)-th pixel row being input as a high level voltage, and the first scan signal SC1(*n*−1) of the (n−1)-th pixel row being input as a low level voltage.

Referring to FIG. 5A, during the initialization period ST1, the third switching transistor T3 and the sixth switching transistor T6 may be turned on. The third switching transistor T3 is turned on to initialize the first node N1 with the reference voltage Vref. In other words, an initial voltage of the first node N1 may be set to the reference voltage Vref.

At the same time, the sixth switching transistor T6 is also turned on based on the first scan signal SC1 (n−1) of the (n−1)-th pixel row to supply the reference voltage Vref to the second node N2. During the initialization period ST1, both the first switching transistor T1 and the driving transistor DT have been turned off, such that the reference voltage Vref of each of the first and second nodes N1 and N2 is not short-circuited with the high-potential driving voltage EVDD.

During the initialization period ST1, as the sixth switching transistor T6 is turned on, the reference voltage Vref may be input to the gate electrode of the driving transistor DT. The reference voltage Vref may act as an initialization voltage that initializes the driving transistor DT. The high-potential driving voltage EVDD may be input to the first electrode (or source electrode) of the driving transistor DT. In this case, the gate-source voltage of the driving transistor DT may correspond to the reference voltage Vref less the high-potential driving voltage EVDD.

Further, during the initialization period ST1, as the third switching transistor T3 and the sixth switching transistor T6 are turned on, the same reference voltage Vref is applied to both opposing ends of the capacitor Cst. In other words, both opposing ends of the capacitor Cst may have the same potential. However, the present disclosure is not limited thereto. Reference voltages Vref of different voltage levels may be respectively supplied to the first node N1 and the second node N2 according to aspects of the disclosure.

Figure 5B:
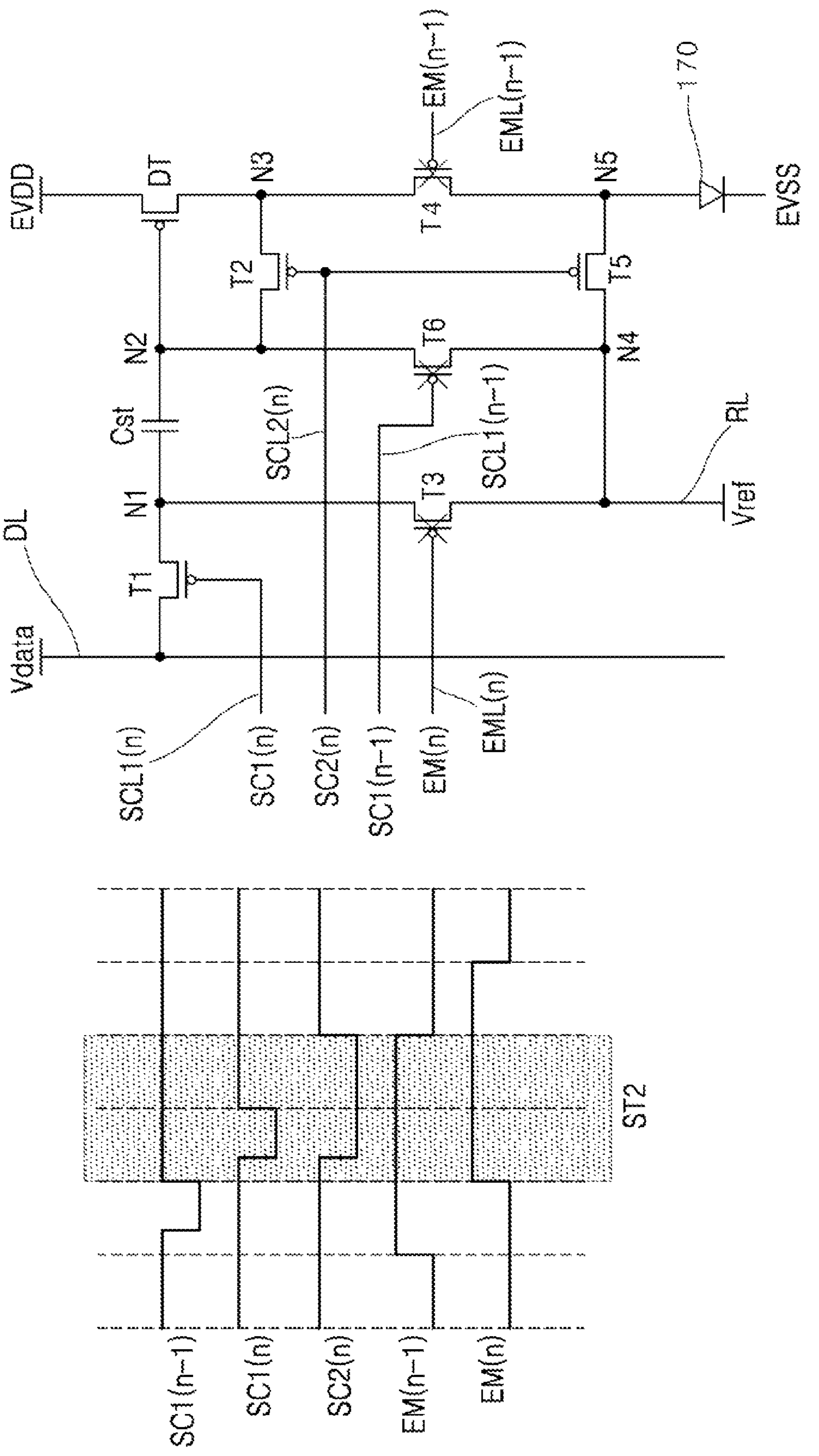

FIG. 5B is a diagram for illustrating a signal applied to each pixel during the sampling period in the operation period of each pixel and the pixel operation characteristics of the sampling period.

The sampling period ST2 is a period for sampling the threshold voltage Vth of the driving transistor DT. The sampling period ST2 may be activated together with a programming period for applying the data voltage Vdata to the driving transistor DT to control an amount of current supplied to the light-emitting element 170. However, the present disclosure is not limited thereto. The sampling period ST2 and the programming period may be activated as separate periods.

The sampling period ST2 may be performed when the data voltage Vdata is supplied to the pixel circuit. During the sampling period ST2, each of the first scan signal SC1(*n*) of the n-th pixel row and the second scan signal SC2(*n*) of the n-th pixel row may be input as a low level voltage. Each of the first scan signal SC1(*n*−1) of the (n−1)-th pixel row, the light-emission control signal EM(n−1) of the (n−1)-th pixel row, and the light-emission control signal EM(n) of the n-th pixel row may be input as a high level voltage.

The sampling period ST2 may start in response to the light-emission control signal EM(n) of the n-th pixel row being input as a high level voltage and the second scan signal SC2(*n*) of the n-th pixel row being input as a low level voltage. The sampling period ST2 may be maintained while the second scan signal SC2(*n*) of the n-th pixel row is a low level voltage.

Referring to FIG. 5B, during the sampling period ST2, the first switching transistor T1 and the second switching transistor T2 are turned on at the same time, such that the data voltage Vdata from the data line DL is supplied to the first node N1 and an input of the capacitor Cst so that the data voltage Vdata is charged into the capacitor Cst.

In this regard, the second switching transistor T2 may connect the gate electrode and the drain electrode of the driving transistor DT to each other such that the driving transistor DT is conductive in a diode manner. Thus, a voltage, which is equal to a sum of the high-potential driving voltage EVDD and the threshold voltage Vth, may be input to the gate electrode of the driving transistor DT. Because the high-potential driving voltage EVDD is input to the source electrode of the driving transistor DT, the gate-source voltage of the driving transistor DT may correspond to the threshold voltage Vth. Therefore, the threshold voltage Vth of the driving transistor DT is sampled via the second node N2.

The sampling period ST2 and the programming period may be activated as separate periods. In this case, while the first switching transistor T1 is turned on, the data voltage Vdata is supplied from the data line DL to the first node N1 and the input of the capacitor Cst, such that the data voltage Vdata is charged into the capacitor Cst. In this regard, the second switching transistor T2 may be turned on or turned off.

During the sampling period ST2, the second scan signal SC2(*n*) of the n-th pixel row may be applied as a low level voltage for a time duration sufficient such that the threshold voltage Vth of the driving transistor DT is sampled. In other words, a pulse width of the second scan signal SC2(*n*) of the n-th pixel row may not be limited to 2 horizontal periods, but may have 3 horizontal periods, or may have 1 horizontal period, if necessary.

In this regard, the first scan signal SC1(*n*) of the n-th pixel row that turns on the first switching transistor T1 has a pulse width smaller than that of the second scan signal SC2(*n*) of the n-th pixel row. For example, the first scan signal SC1(*n*) of the n-th pixel row may have a pulse width of 1 horizontal period or a pulse width smaller than 1 horizontal period. In other words, the programming period may partially overlap the sampling period ST2. Further, the second switching transistor T2 and the fifth switching transistor T5 are turned on based on the second scan signal SC2(*n*) of the n-th pixel row at the same time, such that the fifth node N5 may be initialized with the reference voltage Vref. In other words, the anode electrode 171 of the light-emitting element 170 may be initialized with the reference voltage Vref during the sampling period ST2.

The sampling period ST2 for sampling the threshold voltage Vth of the driving transistor DT does not overlap with the initialization period ST1 for initializing both opposing ends of the capacitor Cst. Thus, a short-circuit between the high-potential driving voltage EVDD and the reference voltage Vref initializing the capacitor Cst may be removed. As a result, a power fluctuation phenomenon caused by the short-circuit between different power sources may be suppressed to prevent image quality defects due to the power fluctuation phenomenon.

Figure 5C:
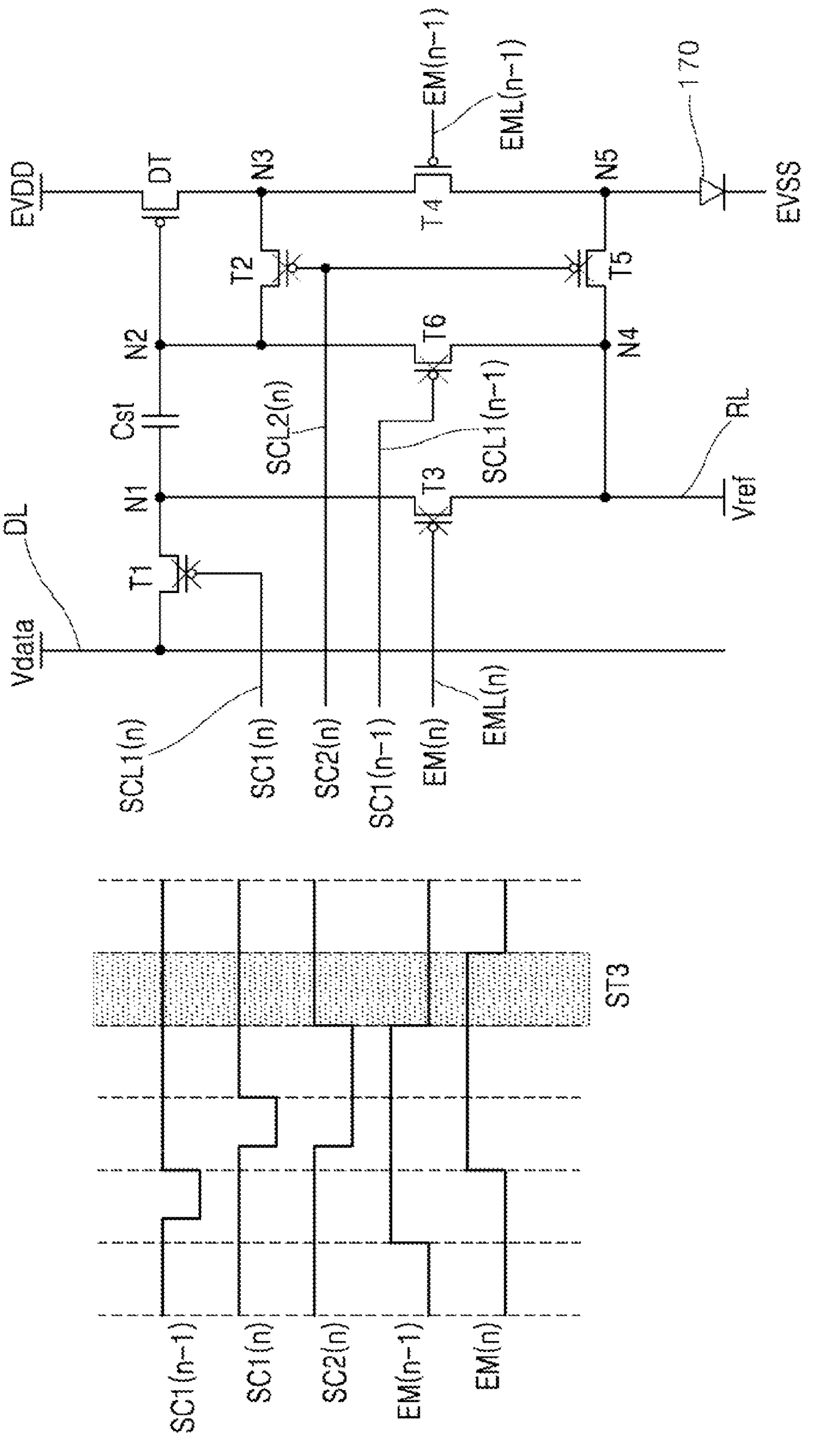

FIG. 5C is a diagram illustrating a signal applied to each pixel for the holding period in the operation period of each pixel and the pixel operation characteristics of the holding period.

The holding period ST3 is a period during which a voltage difference EVDD-Vth between the high-potential driving voltage EVDD of the pixel and the threshold voltage Vth of the driving transistor DT is held at the second node N2.

The holding period ST3 may be performed after the sampling period ST2. The holding period ST3 may be maintained for a duration from a point when the second scan signal SC2(*n*) of the n-th pixel row changes from a low level voltage to a high level voltage to a point when the light-emission control signal EM(n) of the n-th pixel row changes from a high level voltage to a low level voltage.

Referring to FIG. 5C, during the holding period ST3, each of the light-emission control signal EM(n) of the n-th pixel row and the first scan signal SC1(*n*−1) of the (n−1)-th pixel row, the first scan signal SC1(*n*) of the n-th pixel row, and the second scan signal SC2(*n*) of the n-th pixel row may be input as a high level voltage. The light-emission control signal EM(n−1) of the (n−1)-th pixel row may be input as a low level voltage.

During the holding period ST3, the fourth switching transistor T4 is turned on based on the light-emission control signal EM(n−1) of the (n−1)-th pixel row, such that the voltage difference EVDD-Vth between the high-potential driving voltage EVDD and the threshold voltage Vth is held at the second node N2. In this regard, the anode electrode 171 of the light-emitting element 170 is maintained at the reference voltage Vref, and potentials of both opposing ends of the capacitor Cst are equal to each other such that a current path is not generated. Thus, the light-emitting element 170 does not emit light and the holding state is maintained, such that there may be no change in an operation of the pixel circuit. For example, during the holding period ST3, a state immediately after the sampling period ST2, in which the pixel circuit stops for a while without a voltage being applied to the pixel circuit, may be maintained.

Figure 5D:
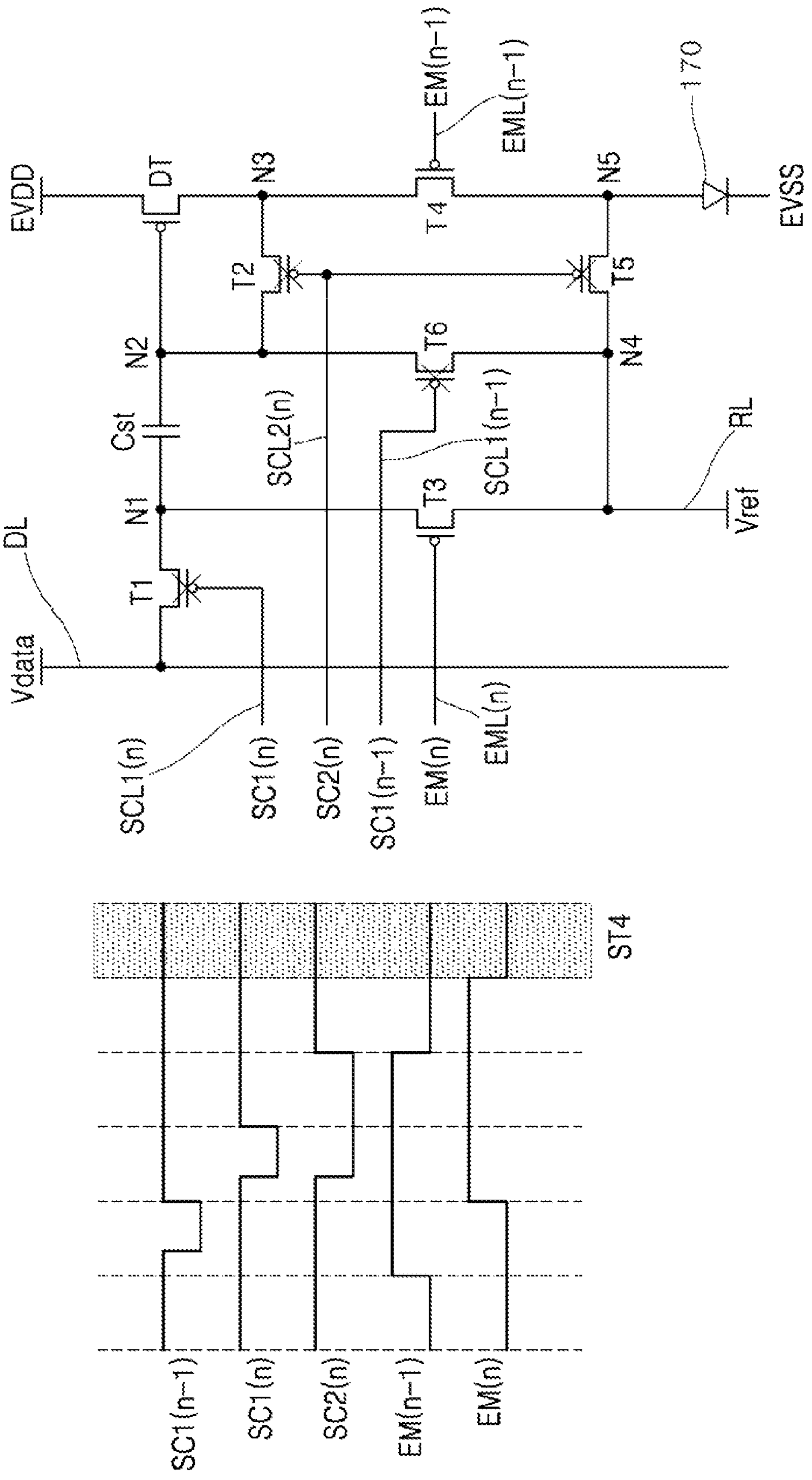

FIG. 5D is a diagram for illustrating a signal applied to each pixel during the light-emission period in the operation period of each pixel, and the pixel operation characteristics of the light-emission period.

The light-emission period ST4 is a period during which a current path between the first and second nodes N1 and N2 is generated such that the light-emitting element 170 starts and maintains light-emission based on an amount of current flowing through the driving transistor DT to the light-emitting element 170.

Referring to FIG. 5D, the light-emission period ST4 may be performed after the sampling period ST2 and/or the holding period ST3. During the light-emission period ST4, each of the first scan signal SC1(*n*−1) of the (n−1)-th pixel row, the first scan signal SC1(*n*) of the n-th pixel row, and the second scan signal SC2(*n*) of the n-th pixel row may be input as a high level voltage. Each of the light-emission control signal EM(n) of the n-th pixel row and the light-emission control signal EM(n−1) of the (n−1)-th pixel row may be input as a low level voltage.

During the light-emission period ST4, the third switching transistor T3 and the fourth switching transistor T4 may be turned on, while the first switching transistor T1, the second switching transistor T2, the fifth switching transistor T5, and the sixth switching transistor T6 may be turned off. Further, during the light-emission period ST4, the driving transistor DT may be turned on.

While the fourth switching transistor T4 is kept in a turned on state based on the light-emission control signal EM(n−1) of the (n−1)-th pixel row, the third switching transistor T3 is turned on based on the light-emission control signal EM(n) of the n-th pixel row. Accordingly, a current path is generated in the capacitor Cst disposed between the first node N1 and the second node N2. Thus, the light-emitting element 170 starts and maintains the light-emission based on the current amount output to the driving transistor DT.

During the light-emission period ST4, a voltage corresponding to EVDD+Vth+(Vref−Vdata) may be input to the gate electrode of the driving transistor DT. The high-potential driving voltage EVDD may be input to the source electrode of the driving transistor DT. In this case, the gate-source voltage of the driving transistor DT may correspond to a voltage determined by Vth+(Vref−Vdata).

In the pixel circuit configured as described above, during the initialization period ST1 of the first and second nodes N1 and N2 and the driving transistor DT, the third switching transistor T3 and the sixth switching transistor T6 may initialize both opposing ends of the capacitor Cst, that is, the first and second nodes N1 and N2 with the reference voltage Vref of the reference voltage line RL. At this time, the first and second nodes N1 and N2 are initialized with the reference voltage Vref while both the first switching transistor T1 and driving transistor DT are turned off. Thus, the short-circuit between the reference voltage Vref of the first and second nodes N1 and N2 and the high-potential driving voltage EVDD may be prevented.

Further, during the initialization period ST1, the sixth switching transistor T6 operates in response to the scan signal SC1(*n*−1) of the (n−1)-th pixel row applied via the first scan line SCL1 (n−1) of a horizontal line pixel of the (n−1)-th pixel row. The sixth switching transistor T6 may operate based on the scan signal SC1(*n*−1) of the (n−1)-th pixel row or based on a separate scan signal which is additionally generated.

In addition, the fourth switching transistor T4 operates in response to the light emission control signal EM(n−1) of the (n−1)-th pixel row applied via the light-emission control line EML (n−1) of a horizontal line pixel of the (n−1)-th pixel row. Thus, the holding operation of the driving transistor DT may be achieved while the gate driver 300 does not generate and supply an additional light-emission control signal.

As described above, in the pixel structure according to an aspect of the present disclosure, the initialization of the first and second nodes N1 and N2 and the holding control of the driving transistor DT may be achieved while the gate driver 300 does not generate an additional scan signal and a light-emission control signal. Thus, a circuit structure of the gate driver 300 may be simplified.

Figure 6:
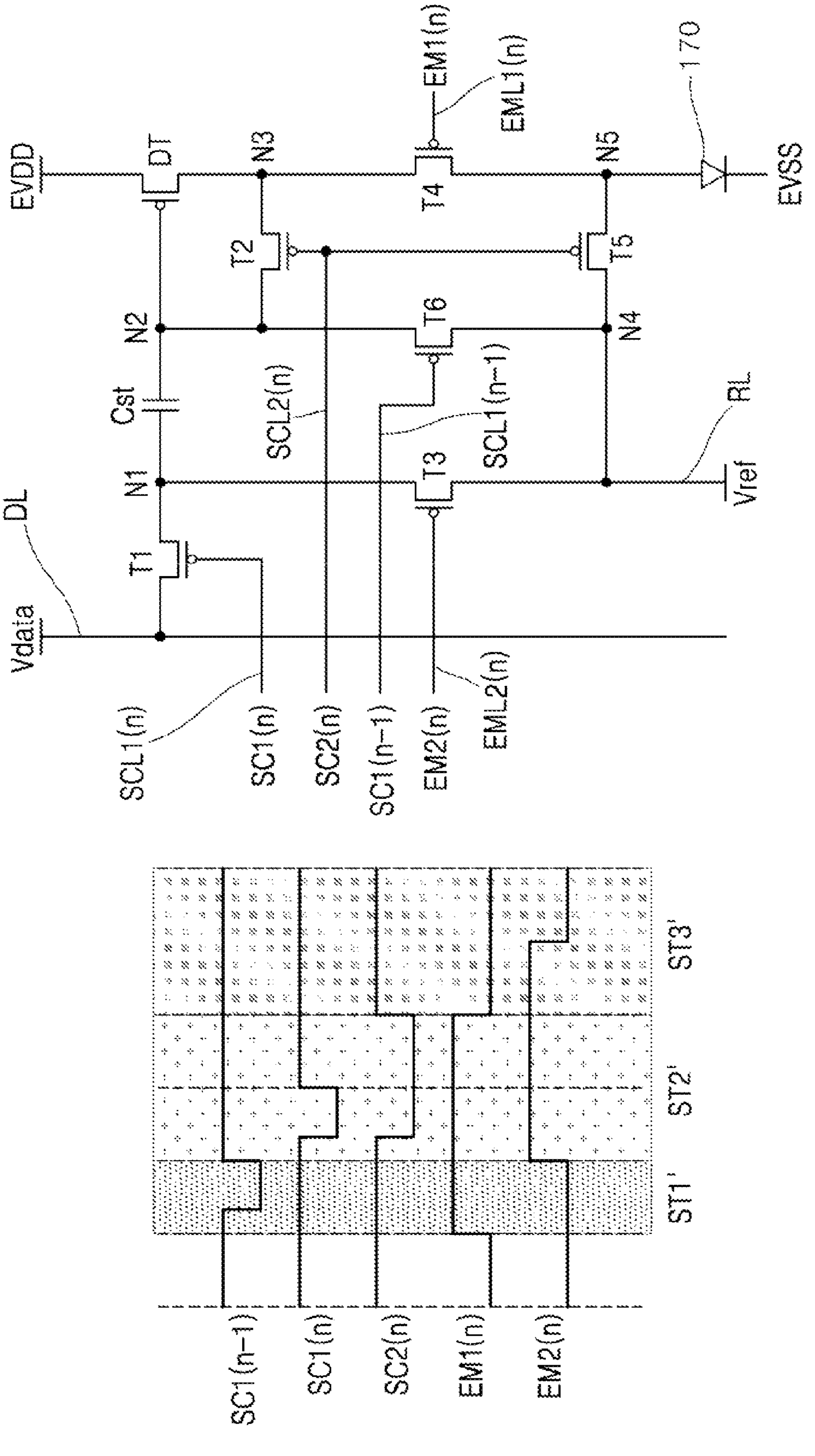
FIG. 6 is a diagram of a pixel circuit of a display device according to another aspect of the present disclosure.

FIG. 6 is a diagram of a pixel circuit of a display device according to another aspect of the present disclosure.

Hereinafter, duplicate descriptions as set forth above with reference to FIG. 4 may be omitted.

Referring to FIG. 6, each pixel includes the pixel circuit connected to each scan line SCL1 and SCL2, each data line DL, each reference voltage line RL, each light-emission control line EML1 and EML2, and each high-potential driving voltage EVDD, and the light-emitting element 170 connected to and disposed between the pixel circuit and the low-potential driving voltage EVSS, wherein the light-emitting element 170 equivalently corresponds to a diode.

The first light-emission control line EML1 and the second light-emission control line EML2 may respectively supply a first light-emission control signal EM1(*n*) and a second light-emission control signal EM2(*n*) to each of pixels.

The fourth switching transistor T4 may be turned on based on the first light-emission control signal EM1(*n*), and the third switching transistor T3 may be turned on based on the second light-emission control signal EM2(*n*).

Further, the first light-emission control signal EM1(*n*) and the second light-emission control signal EM2(*n*) may have different pulse widths. A pulse width of the first light-emission control signal EM1(*n*) may be greater than a pulse width of the second light-emission control signal EM2(*n*). However, the present disclosure is not limited thereto, and the pulse width of the first light-emission control signal EM1(*n*) may be equal to or smaller than the pulse width of the second light-emission control signal EM2(*n*).

In other words, when the first light-emission control signal EM1(*n*) may have a pulse width of 3 horizontal periods, the second light-emission control signal EM2(*n*) may have a pulse width of 2 horizontal periods. However, the present disclosure is not limited thereto, and the first light-emission control signal EM1(*n*) and the second light-emission control signal EM2(*n*) may have the same pulse width.

Referring to FIG. 6, an operation period per each frame of each pixel may include an initialization period ST1', a sampling period ST2', and a light-emission period STY. When the second scan signal SC(n) is converted from a low level voltage to a high level voltage, the first light-emission control signal EM1(*n*) and the second light-emission control signal EM2(*n*) may be converted from a high level voltage to a low level voltage at the same time.

Therefore, the third switching transistor T3 may be turned on to supply the reference voltage Vref to the first node N1, such that the data voltage Vdata stored in the capacitor Cst may be replaced with the reference voltage Vref. In other words, a current path is generated between the first node N1 and the second node N2 respectively connected to both opposing ends of the capacitor Cst such that the driving transistor DT is turned on, and at the same time, the fourth switching transistor T4 is turned on so that the light-emitting element 170 may emit light. That is, the light-emission period ST3' may be activated immediately after the sampling period ST2'.

Since the first light-emission control signal EM1(*n*) and the second light-emission control signal EM2(*n*) are separate signals, the third switching transistor T3 and the fourth switching transistor T4 may be controlled independently.

Figure 7:
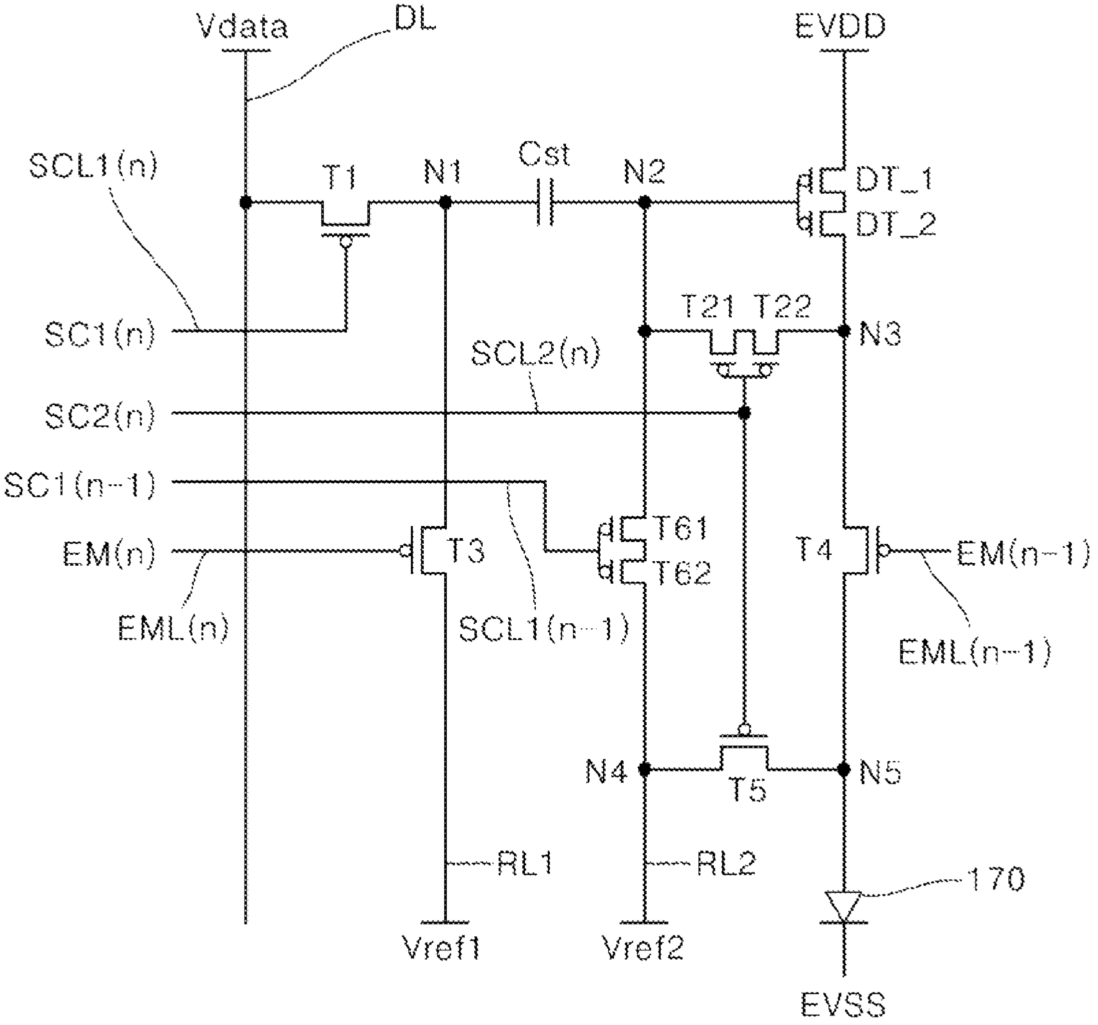
FIG. 7 is a diagram of a pixel circuit of a display device according to still another aspect of the present disclosure

FIG. 7 is a diagram of a pixel circuit of a display device according to still another aspect of the present disclosure.

In some aspects, the driving transistor DT may include a plurality of sub-transistors. In this case, the driving transistor DT may be referred to as a multi transistor or a dual transistor DT_1 and DT_2. Further, at least one of the first to sixth switching transistors T1 to T6 may include a plurality of sub-transistors. In this case, at least one of the first to sixth switching transistors T1 to T6 may be referred to as a multi transistor or a dual transistor.

For example, when the driving transistor DT includes a plurality of sub-transistors, a yield of the driving transistor DT may be improved. Further, when the second switching transistor T2 includes a plurality of sub-transistors T21 and T22, current leaking from the driving transistor DT may be effectively reduced. When the sixth switching transistor T6 includes a plurality of sub-transistors T61 and T62, current leakage from the sixth switching transistor T6, for example, leakage current occurring between the second node N2 and the reference voltage line RL1 and RL2 may be effectively reduced.

Referring to FIG. 7, in the pixel circuit structure for the light-emitting element 170, the pixel circuit controls a light-emitting operation of the light-emitting element 170 using a first reference voltage Vref1 and a second reference voltage Vref2 having different voltage levels.

To this end, an arrangement structure of the first to fourth switching transistors T1 to T4 and the sixth switching transistor T6 may be the same as that as shown in FIG. 4 to FIG. 6, except that only the fifth switching transistor T5 is configured to supply the second reference voltage Vref2 supplied via the second reference voltage line RL2 to the anode electrode 171 of the light-emitting element 170.

An operation period of the pixel circuit for the light-emitting element 170 as shown in FIG. 7 may be sequentially divided into the initialization period ST1, the sampling period ST2, the holding period ST3, and the light-emission period ST4 of the light-emitting element 170 as described with reference to FIG. 5A to FIG. 5D.

However, during the sampling period ST2 in the operation period of the pixel circuit for the light-emitting element 170 as shown in FIG. 7, the fifth switching transistor T5 may be turned on based on the second scan signal SC2(*n*) of the n-th pixel row from the second scan line SCL2 to supply the second reference voltage Vref2 supplied via the second reference voltage line RL2 to the anode electrode 171 of the light-emitting element 170. In this way, the fifth switching transistor T5 supplying the second reference voltage Vref2 to the anode electrode of the light-emitting element 170 during the sampling period ST2 may allow the anode electrode 171 of the light-emitting element 170 to be maintained at a magnitude of the second reference voltage Vref2 for the subsequent holding period ST3. When the magnitude of the second reference voltage Vref2 is set to be larger than that of the first reference voltage Vref1 used as the reference voltage, the holding operation may be stably performed so that no current path is generated during the sampling period ST2 and the holding period ST3. Thus, sampling efficiency of the threshold voltage Vth of the driving transistor DT and holding efficiency of the driving voltage may be further improved.

Figure 8:
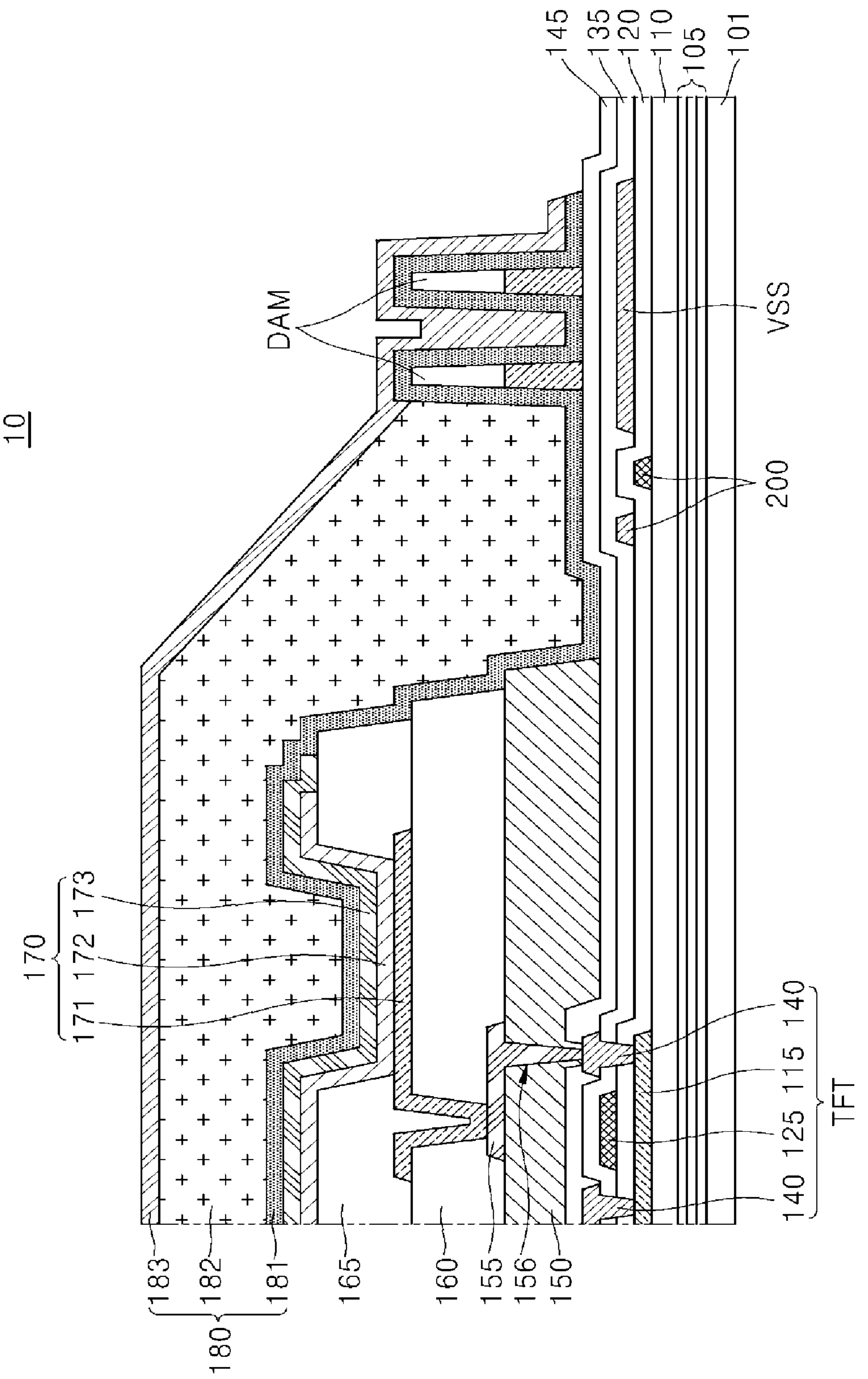
FIG. 8 is a cross-sectional view showing a stacked form of a display device according to an aspect of the present disclosure.

FIG. 8 is a cross-sectional view showing a stacked form of a display device 10 according to an aspect of the present disclosure.

Referring to FIG. 8, a thin-film transistor TFT for driving the light-emitting element 170 may be disposed in the display area AA and on the substrate 101. The thin-film transistor TFT may include a semiconductor layer 115, a gate electrode 125, and source and drain electrodes 140. The thin-film transistor TFT may include a driving transistor. For convenience of illustration, only the driving transistor among various thin-film transistors that may be included in the display device 10 is shown. Other thin-film transistors such as the switching transistors may also be included in the display device 10. Further, an example in which the thin-film transistor TFT has a coplanar structure is described. However, the thin-film transistor may be implemented to have other structures such as a staggered structure. The present disclosure is not limited thereto.

The driving transistor may receive the high-potential driving voltage EVDD in response to the data signal supplied to the gate electrode 125 of the driving transistor to control the current amount supplied to the light-emitting element 170 to adjust an amount of light emitted from the light-emitting element 170. The driving transistor may supply a constant current based on a voltage charged in a storage capacitor (not shown) to maintain light emission of the light-emitting element 170 until a data signal of the next frame is supplied. The high-potential supply line may extend in a parallel manner to the data line.

As shown in FIG. 8, the thin-film transistor TFT includes the semiconductor layer 115 disposed on a first insulating layer 110, the gate electrode 125 overlapping the semiconductor layer 115 while a second insulating layer 120 is interposed therebetween, and the source and drain electrodes 140 formed on a third insulating layer 135 and contacting the semiconductor layer 115.

The semiconductor layer 115 may form a channel during an operation of the thin-film transistor TFT. The semiconductor layer 115 may be made of an oxide semiconductor or may be made of various organic semiconductors such as amorphous silicon (a-Si), polycrystalline silicon (poly-Si), or pentacene. The present disclosure is not limited thereto. The semiconductor layer 115 may be formed on the first insulating layer 110. The semiconductor layer 115 may include a channel area, a source area, and a drain area. The channel area may overlap with the gate electrode 125 while the first insulating layer 110 is interposed therebetween. The channel area may be formed between the source and drain electrodes 140. The source area may be electrically connected to the source electrode 140 via a contact hole extending through the second insulating layer 120 and the third insulating layer 135. The drain area may be electrically connected to the drain electrode 140 via a contact hole extending through the second insulating layer 120 and the third insulating layer 135. A buffer layer 105 and the first insulating layer 110 may be disposed between the semiconductor layer 115 and a substrate 101. The buffer layer 105 may protect the substrate 101 from diffusion of moisture and/or oxygen. The first insulating layer 110 may protect the semiconductor layer 115 and may block various types of defects introduced from the substrate 101.

The uppermost layer of the buffer layer 105 in contact with the first insulating layer 110 may be made of a material having different etching characteristics from those of each of the remaining layers of the buffer layer 105, the first insulating layer 110, the second insulating layer 120 and the third insulating layer 135. The uppermost layer of the buffer layer 105 contacting the first insulating layer 110 may be made of one of silicon nitride ($SiN_x$) and silicon oxide ($SiO_x$). Each of the remaining layers of the buffer layer 105, the first insulating layer 110, the second insulating layer 120, and the third insulating layer 135 may be made of the other of silicon nitride (SiN) and silicon oxide ($SiO_x$). For example, the uppermost layer of the buffer layer 105 in contact with the first insulating layer 110 may be made of silicon nitride ($SiN_x$), while each of the remaining layers of the buffer layer 105, the first insulating layer 110, the second insulating layer 120, and the third insulating layer 135 may be made of silicon oxide ($SiO_x$). The present disclosure is not limited thereto.

The gate electrode 125 may be formed on the second insulating layer 120 and may overlap the channel area of the semiconductor layer 115 while the second insulating layer 120 is interposed therebetween. The gate electrode 125 may be made of a first conductive material and may be embodied as a single layer or multi-layers made of magnesium (Mg), molybdenum (Mo), aluminum (Al), chromium (Cr), gold (Au), titanium (Ti), nickel (Ni), neodymium (Nd), copper (Cu), or an alloy thereof. The present disclosure is not limited thereto.

The source electrode 140 may be connected to the exposed source area of the semiconductor layer 115 via the contact hole extending through the second insulating layer 120 and the third insulating layer 135. The drain electrode 140 may be opposite to the source electrode 140 and may be connected to the drain area of the semiconductor layer 115 via the contact hole extending through the second insulating layer 120 and the third insulating layer 135. Each of the source and drain electrodes 140 may be made of a second conductive material and may comprise a single layer or multi-layers made of molybdenum (Mo), aluminum (Al), chromium (Cr), gold (Au), titanium (Ti), nickel (Ni), neodymium (Nd), copper (Cu), or an alloy thereof. The present disclosure is not limited thereto.

A connection electrode 155 may be disposed between a first middle layer 150 and a second middle layer 160. The connection electrode 155 may be connected to the drain electrode 140 via a connection electrode contact hole 156 extending through a protective film 145 and the first middle layer 150. The connection electrode 155 may be made of a material having low resistivity that is identical to or similar to the drain electrode 140. The present disclosure is not limited thereto.

Referring to FIG. 8, the light-emitting element 170 including the light-emitting layer 172 may be disposed on the second middle layer 160 and a bank layer 165. The light-emitting element 170 may include the anode electrode 171, at least one light-emitting layer 172 formed on the anode electrode 171, and the cathode electrode 173 formed on the light-emitting layer 172.

The anode electrode 171 may be electrically connected to an exposed portion of the connection electrode 155 via a contact hole extending through the second middle layer 160 disposed on the first middle layer 150.

The anode electrode 171 of each pixel is not covered with the bank layer 165. The bank layer 165 may be made of an opaque material (e.g., black) to prevent light interference between adjacent pixels. In this case, the bank layer 165 may include a light-shielding material including at least one of color pigment, organic black, and carbon black. The present disclosure is not limited thereto.

Referring to FIG. 8, the at least one light-emitting layer 172 may be formed on a portion of the anode electrode 171 corresponding to a light-emitting area defined by the bank layer 165. The at least one light-emitting layer 172 may include a hole transport layer, a hole injection layer, a hole blocking layer, a light-emitting layer 172, an electron injection layer, an electron blocking layer, and an electron transport layer on the anode electrode 171. A stacking order of the hole transport layer, the hole injection layer, the hole blocking layer, the light-emitting layer 172, the electron injection layer, the electron blocking layer, and the electron transport layer may be based on a light-emitting direction. In addition, the light-emitting layer 172 may include first and second light-emitting stacks facing each other while a charge generating layer is interposed therebetween. In this case, the light-emitting layer 172 of one of the first and second light-emitting stacks may generate blue light, while the light-emitting layer 172 of the other of the first and second light-emitting stacks may generate yellow-green light so that white light may be generated from a combination of the first and second light-emitting stacks. The white light generated from the combination of the first and second light-emitting stacks may be incident to a color filter positioned above or below the light-emitting layer 172 such that a color image may be realized. In another example, each light-emitting layer 172 may generate each color light corresponding to each pixel without a separate color filter such that a color image may be rendered. For example, the light-emitting layer 172 of a red (R) pixel emits red light, the light-emitting layer 172 of a green (G) pixel emits green light, and the light-emitting layer 172 of a blue (B) pixel emits blue light.

Referring to FIG. 8, the cathode electrode 173 may be formed to face the anode electrode 171 while the light-emitting layer 172 is disposed therebetween and may receive the high-potential driving voltage EVDD.

An encapsulation layer 180 may block penetration of external moisture or oxygen into the light-emitting element 170, which is vulnerable to external moisture or oxygen. To this end, the encapsulation layer 180 may include at least one inorganic encapsulation layer and at least one organic encapsulation layer. The present disclosure is not limited thereto. In the present disclosure, a structure of the encapsulation layer 180 in which a first encapsulation layer 181, a second encapsulation layer 182, and a third encapsulation layer 183 are sequentially stacked is described by way of example.

The first encapsulation layer 181 is formed on the substrate 101 on which the cathode electrode 173 is formed. The third encapsulation layer 183 is formed on the substrate 101 on which the second encapsulation layer 182 is formed. The third encapsulation layer 183 and the first encapsulation layer 181 may surround a top face, a bottom face and a side face of the second encapsulation layer 182. The first encapsulation layer 181 and the third encapsulation layer 183 may block penetration of external moisture or oxygen into the light-emitting element 170. Each of the first encapsulation layer 181 and the third encapsulation layer 183 may be made of an inorganic insulating material that may be deposited at a low temperature, such as silicon nitride ($SiN_x$), silicon oxide ($SiO_x$), silicon oxynitride (SiON), or aluminum oxide ($Al_2O_3$). Each of the first encapsulation layer 181 and the third encapsulation layer 183 is deposited in a low temperature atmosphere. Thus, during a deposition process of the first encapsulation layer 181 and the third encapsulation layer 183, the light-emitting element 170, which is vulnerable to a high-temperature atmosphere, may be prevented from being damaged.

The second encapsulation layer 182 serves as a shock-absorbing layer to relieve a stress between layers due to bending of the display device 10 and may planarize a step between layers. The second encapsulation layer 182 may be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. The present disclosure is not limited thereto. When the second encapsulation layer 182 is formed using an inkjet method, a dam DAM may be disposed to prevent the second encapsulation layer 182, which can be in a liquid state, from spreading to an edge of the substrate 101. The dam DAM may be closer to the edge of the substrate 101 than the second encapsulation layer 182 may be. The dam DAM may prevent the second encapsulation layer 182 in the liquid state from spreading to a pad area where a conductive pad disposed at the outermost side of the substrate 101 is disposed.

The dam DAM prevents diffusion of the second encapsulation layer 182. However, when the second encapsulation layer 182 overflows the dam DAM during a process, the second encapsulation layer 182, which is an organic layer, may be exposed to an outside so that moisture or the like may leak into the light-emitting element. Therefore, to prevent the leakage, at least eight or more dams DAM may be stacked.

Referring to FIG. 8, the dam DAM may be disposed on the protective film 145 and in the non-display area NA.

Further, the dam DAM, and the first middle layer 150 and the second middle layer 160 may be formed simultaneously. The first middle layer 150, and a lower layer of the dam DAM may be formed simultaneously. The second middle layer 160, and an upper layer of the dam DAM may be formed simultaneously. Thus, the dam DAM may have a double layer structure.

Accordingly, the dam DAM may be made of the same material as that of each of the first middle layer 150 and the second middle layer 160. However, the present disclosure is not limited thereto.

Referring to FIG. 8, the dam DAM may overlap the low-potential driving power line VSS. For example, the low-potential driving power line VSS may be formed in a layer under the dam DAM and in the non-display area NA.

The low-potential driving power line VSS and the gate driver 300 in a form of a GIP may surround a periphery of the display panel. The low-potential driving power line VSS may be located outwardly of the gate driver 300. Further, the low-potential driving power line VSS may be connected to the anode electrode 171 to apply a common voltage thereto. The gate driver 300 is simply illustrated in plan and cross-sectional views. However, the gate driver 300 may be configured using a thin-film transistor TFT having the same structure as that of the thin-film transistor TFT of the display area AA.

Referring to FIG. 8, the low-potential driving power line VSS is disposed outwardly of the gate driver 300. The low-potential driving power line VSS is disposed outwardly of the gate driver 300 and surrounds the display area AA. The low-potential driving power line VSS may be made of the same material as that of each of the source and drain electrodes 140 of the thin-film transistor TFT. The present disclosure is not limited thereto. For example, the low-potential driving power line VSS may be made of the same material as that of the gate electrode 125.

Further, the low-potential driving power line VSS may be electrically connected to the anode electrode 171. The low-potential driving power line VSS may supply the low-potential driving voltage EVSS to the plurality of pixels in the display area AA.

In the display device according to aspects of the present disclosure as described above, the pixel circuit structure for the light-emitting element 170 may be improved such that during the initialization period ST1, the voltages of both opposing ends of the capacitor Cst may be initialized with the same reference voltage Vref. This may eliminate the initialization short-circuit of the pixel circuit, thereby preventing the occurrence of defective image display of each pixel and improving reliability thereof.

Further, the switching transistors of the light-emitting element pixel circuit may be turned on based on the scan signal scan (n−1) or the light-emission control signal EM(n−1) of the (n−1)-th pixel row in a sharing manner thereof. Thus, the structure of the gate driver 300 that generates the first scan signal SC1(*n*), the second scan signal SC2(*n*), and the light-emission control signal EM(n) is simplified, and a size thereof may be reduced.

A display device according to an aspect of the present disclosure may be described as follows.

One aspect of the present disclosure provides a display device comprising: a light-emitting element; and a pixel circuit configured to control the light-emitting element, wherein the pixel circuit includes: a capacitor connected to and disposed between a first node and a second node; and a driving transistor including a gate electrode connected to the second node; a first electrode receiving a high-potential driving voltage; and a second electrode connected to a third node, wherein the pixel circuit is configured such that the same voltage is supplied to the first node and the second node during at least a portion of an operation period of the pixel circuit.

In one implementation of the display device, a first transistor and a second transistor are respectively connected to both opposing ends of the capacitor, wherein the pixel circuit is configured to initialize the capacitor using at least one of the first transistor and the second transistor.

In one implementation of the display device, the operation period includes an initialization period, a sampling period, a holding period, and a light-emission period, wherein each of the initialization period, the sampling period, the holding period, and the light-emission period is separately activated based on: a first scan signal; a second scan signal having the same pulse width as a pulse width of the first scan signal, and a different phase from a phase of the first scan signal; a third scan signal having a pulse width different from the pulse width of each of the first scan signal and the second scan signal; and a light-emission control signal.

In one implementation of the display device, the pulse width of the first scan signal and the second scan signal is smaller than the pulse width of the third scan signal.

In one implementation of the display device, the light-emission control signal includes: a first light-emission control signal; and a second light-emission control signal having a different phase from a phase of the first light-emission control signal.

In one implementation of the display device, the first light-emission control signal has the same pulse width as a pulse width of the second light-emission control signal.

In one implementation of the display device, the first light-emission control signal has a different pulse width from a pulse width of the second light-emission control signal.

In one implementation of the display device, during the initialization period, the pixel circuit is configured to supply a first reference voltage to the first node and supply a second reference voltage to the second node.

In one implementation of the display device, the first reference voltage and the second reference voltage have the same or different voltage levels.

In one implementation of the display device, each of the first scan signal and the second scan signal has a pulse width smaller than 1 horizontal period.

In one implementation of the display device, the pixel circuit further includes: a third transistor connected to and disposed between the second node and the third node, wherein the third transistor is turned on in response to the third scan signal to connect a gate electrode and a drain electrode of the driving transistor to each other such that the driving transistor is conductive in a diode manner; a fourth transistor turned on in response to the light-emission control signal to electrically connect the driving transistor to the light-emitting element; and a fifth transistor turned on in response to the third scan signal to initialize the light-emitting element.

In one implementation of the display device, the driving transistor includes a plurality of sub-transistors.

Another aspect of the present disclosure provides a display device comprising: a display panel in which a plurality of data lines, a plurality of scan lines, a plurality of light-emission control lines, and a plurality of pixels are disposed; a gate driver sequentially supplying a scan signal to the plurality of scan lines and sequentially supplying a light-emission control signal to the plurality of light-emission control lines; a data driver supplying a data voltage to the plurality of data lines; and a controller for controlling the gate driver and the data driver, wherein each of the plurality of pixels includes: a light-emitting element; and a pixel circuit configured to control the light-emitting element, wherein the pixel circuit includes: a capacitor connected to and disposed between a first node and a second node; and a driving transistor including a gate electrode connected to the second node; a first electrode receiving a high-potential driving voltage; and a second electrode connected to a third node, wherein the pixel circuit is configured such that the same voltage is supplied to the first node and the second node during at least a portion of an operation period of the pixel circuit.

In one implementation of the display device, the operation period includes an initialization period, a sampling period, a holding period, and a light-emission period, wherein each of the initialization period, the sampling period, the holding period, and the light-emission period is separately activated based on: a first scan signal; a second scan signal having the same pulse width as a pulse width of the first scan signal, and a different phase from a phase of the first scan signal; a third scan signal having a pulse width different from the pulse width of each of the first scan signal and the second scan signal; and a light-emission control signal.

In one implementation of the display device, the display panel has a shape in which at least a portion of one side is recessed inwardly in a plan view of the display panel.

In one implementation of the display device, the display panel has a shape in which at least a portion of one side is recessed inwardly of a remaining portion thereof by a first length in a plan view of the display panel.

The features, structures, effects, etc. as described above in the above-described example of the present disclosure are included in at least one example of the present disclosure. However, the present disclosure is not necessarily limited to only one example. Furthermore, the features, structures, effects, etc. exemplified in at least one example of the present disclosure may be combined with each other or modified in other examples by a person having ordinary knowledge in the field to which the present disclosure belongs. Therefore, contents related to these combinations and modifications should be interpreted as being included within the scope of the present disclosure.

The present disclosure as described above is not limited to the foregoing aspect and the accompanying drawings. It will be clear to those of ordinary skill in the art to which the present disclosure belongs that various substitutions, modifications, and changes may be made within the scope of the technical idea of the present disclosure. Therefore, the scope of the present disclosure is indicated by the following claims. All changes or modifications derived from the meaning and scope of the claims and their equivalent concepts should be construed as being included in the scope of the present disclosure.

What is claimed is:

1. A display device comprising:
- a display panel in which a plurality of pixels are disposed;
- a data driver supplying a data voltage to the plurality of pixels; and
- a demultiplexer unit is disposed between the data driver and a display area of the display panel,
- wherein each of the plurality of pixels includes:
- a light-emitting element; and
- a pixel circuit configured to control the light-emitting element,
- wherein the pixel circuit includes:
  - a capacitor connected to and disposed between a first node and a second node; and
  - a driving transistor including a gate electrode connected to the second node, a first electrode receiving a driving voltage, and a second electrode connected to a third node,
  - wherein the pixel circuit is configured such that a reference voltage is supplied to the first node and the second node during a portion of an operation period of the pixel circuit,
  - wherein the demultiplexer unit distribute a data voltage output from one channel of the data driver in a time division manner and supplies to the plurality of pixels.

2. The display device of claim 1, wherein a first transistor and a second transistor are respectively connected to both opposing ends of the capacitor,
- wherein the pixel circuit is configured to initialize the capacitor using at least one of the first transistor and the second transistor.

3. The display device of claim 1, wherein the operation period includes an initialization period, a sampling period, a holding period, and a light-emission period,
- wherein each of the initialization period, the sampling period, the holding period, and the light-emission period is separately activated based on:
  - a first scan signal;
  - a second scan signal having the same pulse width as a pulse width of the first scan signal, and a different phase from a phase of the first scan signal;
  - a third scan signal having a different pulse width from the pulse width of each of the first scan signal and the second scan signal; and
  - a light-emission control signal.

4. The display device of claim 3, wherein the pulse width of the first scan signal and the second scan signal is smaller than the pulse width of the third scan signal.

5. The display device of claim 3, wherein the light-emission control signal includes:
- a first light-emission control signal; and
- a second light-emission control signal having a different phase from a phase of the first light-emission control signal.

6. The display device of claim 5, wherein a pulse width of the first light-emission control signal is equal to a pulse width of the second light-emission control signal.

7. The display device of claim 5, wherein a pulse width of the first light-emission control signal is different than a pulse width of the second light-emission control signal.

8. The display device of claim 3, wherein, during the initialization period, the pixel circuit is configured to supply a first reference voltage to the first node and supply a second reference voltage to the second node.

9. The display device of claim 8, wherein the first reference voltage and the second reference voltage have the same or different voltage levels.

10. The display device of claim 3, wherein the first scan signal and the second scan signal have a pulse width of less than 1 horizontal period.

11. The display device of claim 3, wherein the pixel circuit further includes:

a third transistor connected to and disposed between the second node and the third node, wherein the third transistor is turned on in response to the third scan signal to connect the gate electrode and a drain electrode of the driving transistor to form a diode path using the driving transistor;

a fourth transistor turned on in response to the light-emission control signal to electrically connect the driving transistor to the light-emitting element; and a fifth transistor turned on in response to the third scan signal to initialize the light-emitting element.

12. The display device of claim 1, wherein the driving transistor includes a plurality of sub-transistors.

13. A display device comprising:

a display panel in which a plurality of data lines, a plurality of scan lines, a plurality of light-emission control lines, and a plurality of pixels are disposed;

a gate driver sequentially supplying a scan signal to the plurality of scan lines and sequentially supplying a light-emission control signal to the plurality of light-emission control lines;

a data driver supplying a data voltage to the plurality of data lines;

a demultiplexer unit is disposed between the data driver and a display area of the display panel; and a controller for controlling the gate driver and the data driver, wherein each of the plurality of pixels includes:

a light-emitting element; and a pixel circuit configured to control the light-emitting element, wherein the pixel circuit includes:

a capacitor connected to and disposed between a first node and a second node; and a driving transistor including a gate electrode connected to the second node; a first electrode receiving a first driving voltage; and a second electrode connected to a third node, wherein the pixel circuit is configured such that a reference voltage is supplied to the first node and the second node during a portion of an operation period of the pixel circuit, wherein the demultiplexer unit distribute a data voltage output from one channel of the data driver in a time division manner and supplies to the plurality of pixels.

14. The display device of claim 13, wherein the operation period includes an initialization period, a sampling period, a holding period, and a light-emission period, wherein each of the initialization period, the sampling period, the holding period, and the light-emission period is separately activated based on:

a first scan signal;

a second scan signal having the same pulse width as a pulse width of the first scan signal, and a different phase from a phase of the first scan signal;

a third scan signal having a different pulse width from the pulse width of each of the first scan signal and the second scan signal; and the light-emission control signal.

15. The display device of claim 13, wherein the display panel has a shape in which at least a portion of one side of the display panel is recessed inwardly in a plan view of the display panel.

16. The display device of claim 13, wherein the display panel has a shape in which at least a portion of one side of the display panel is recessed inwardly of a remaining portion of the side by a first length in a plan view of the display panel.

* * * * *